(12) United States Patent
Yang et al.

(10) Patent No.: US 9,558,770 B2
(45) Date of Patent: Jan. 31, 2017

(54) SLOT WAVEGUIDE THAT COUPLES ENERGY TO A NEAR-FIELD TRANSDUCER

(71) Applicant: Seagate Technology LLC, Cupertino, CA (US)

(72) Inventors: Ruoxi Yang, St. Louis Park, MN (US); Mark Anthony Gubbins, Donegal (IE); Aidan Goggin, Donegal (IE); Michael J. Hardy, Londonderry (GB); Roberto Fernandez Garcia, Derry (GB); Choon How Gan, Derry (GB)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/085,162

(22) Filed: Mar. 30, 2016

(65) Prior Publication Data

US 2016/0293189 A1    Oct. 6, 2016

Related U.S. Application Data

(60) Provisional application No. 62/139,967, filed on Mar. 30, 2015.

(51) Int. Cl.

| | | |
|---|---|---|
| *G11B 11/00* | (2006.01) | |
| *G11B 5/02* | (2006.01) | |
| *G11B 5/48* | (2006.01) | |
| *G02B 6/122* | (2006.01) | |
| *G02B 6/126* | (2006.01) | |
| *G11B 5/00* | (2006.01) | |

(52) U.S. Cl.
CPC ............. *G11B 5/4866* (2013.01); *G02B 6/126* (2013.01); *G02B 6/1223* (2013.01); *G02B 6/1228* (2013.01); *G11B 2005/0021* (2013.01)

(58) Field of Classification Search
CPC ............... G11B 2005/2525; G11B 2005/0021; G11B 2005/0005; G11B 5/314; G11B 5/3903; G11B 11/10595; G11B 11/1053; G11B 11/1058; B82Y 25/00; B82Y 10/00
USPC .......... 360/59, 313; 369/13.14, 13.17, 13.02, 369/13.33
See application file for complete search history.

(56) References Cited

U.S. PATENT DOCUMENTS

| | | | |
|---|---|---|---|
| 7,519,257 B2 * | 4/2009 | Lipson | ............... B82Y 20/00 385/126 |
| 7,898,759 B2 | 3/2011 | Matsumoto et al. | |
| 7,961,417 B2 | 6/2011 | Seigler et al. | |
| 8,078,021 B2 | 12/2011 | Ushida | |

(Continued)

OTHER PUBLICATIONS

Yang et al., "Efficient light coupling between dielectric slot waveguide and plasmonic slot waveguide", Optics Letters, vol. 35, No. 5, Mar. 1, 2010, pp. 649-651.

(Continued)

*Primary Examiner* — Nabil Hindi
(74) *Attorney, Agent, or Firm* — Hollingsworth Davis, LLC

(57) ABSTRACT

A dual-slot waveguide receives energy from a coupling waveguide. The dual-slot waveguide includes first and second light propagating regions of low-index material located side-by-side in a direction normal to a light propagation direction. Inner sides of the first and second light propagating regions are separated by a first region of a high-index material. Second and third regions of the high-index material surround outer sides of the first and second light propagating regions. A near-field transducer receives portions of the energy from the first and second light propagating regions.

20 Claims, 20 Drawing Sheets

(56) References Cited

U.S. PATENT DOCUMENTS

| | | |
|---|---|---|
| 8,948,554 B2 | 2/2015 | Thylen et al. |
| 9,001,628 B1 | 4/2015 | Shi et al. |
| 9,190,085 B1 | 11/2015 | Yuan et al. |
| 2015/0302874 A1 | 10/2015 | Asselin et al. |

OTHER PUBLICATIONS

Almeida et al., "Guiding and confining light in void nanostructure", Optics Letters, vol. 29, No. 11, Jun. 1, 2004, pp. 1209-1211.

\* cited by examiner ion direction. Inner sides of the first and second light propagating regions are separated by at least one first region of a high-index material. Second and third regions of the high-index material surround outer sides of the first and second light propagating regions. A near-field transducer is proximate an output end of the dual-slot waveguide. The near-field transducer includes first and second sides that receive respective first and second portions of the energy from the first and second light propagating regions.

SLOT WAVEGUIDE THAT COUPLES ENERGY TO A NEAR-FIELD TRANSDUCER

RELATED PATENT DOCUMENTS

This application claims the benefit of Provisional Patent Application Ser. No. 62/139,967 filed on Mar. 30, 2015, to which priority is claimed pursuant to 35 U.S.C. §119(e), and which is incorporated herein by reference in its entirety.

SUMMARY

The present disclosure relates to a dual-slot waveguide that couples energy to a near-field transducer. In one embodiment, a coupling waveguide is configured to receive energy from an energy source. A dual-slot waveguide receives the energy from the coupling waveguide. The dual-slot waveguide includes first and second light propagating regions of first and second low-index material located side-by-side in a direction normal to a light propagation direction. Inner sides of the first and second light propagating regions are separated by at least one first region of a high-index material. Second and third regions of the high-index material surround outer sides of the first and second light propagating regions. A near-field transducer is proximate an output end of the dual-slot waveguide. The near-field transducer includes first and second sides that receive respective first and second portions of the energy from the first and second light propagating regions.

In another embodiment, a slot waveguide is configured to receive energy from an energy source. The slot waveguide has first and second high-index regions surrounding a middle, low-index region that extends along a light propagation direction. The first and second high-index regions have angled portions that form an output taper that results in a reduced cross-track width in the low-index region as it approaches the media facing surface. A near-field transducer is proximate an output portion of the low-index region at media-facing surface. Light propagates through the low-index region and is coupled to the near-field transducer at the output portion.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to waveguides that deliver energy to a near-field transducer (NFT) that is used in applications such as heat-assisted magnetic recording (HAMR). This technology, also referred to as energy-assisted media recording (EAMR), thermally-assisted media recording (TAMR), and thermally-assisted recording (TAR), etc., uses an energy source such as a laser to couple energy to a NFT, which achieves surface plasmon resonance in response. The surface plasmons are directed to heat a small spot on a recording medium (e.g., magnetic disk) during recording. The heat lowers magnetic coercivity at the hot spot, allowing a write transducer to change magnetic orientation. Due to the relatively high coercivity of the recording medium after cooling, the data is less susceptible to paramagnetic effects that can lead to data errors.

Figure 1:
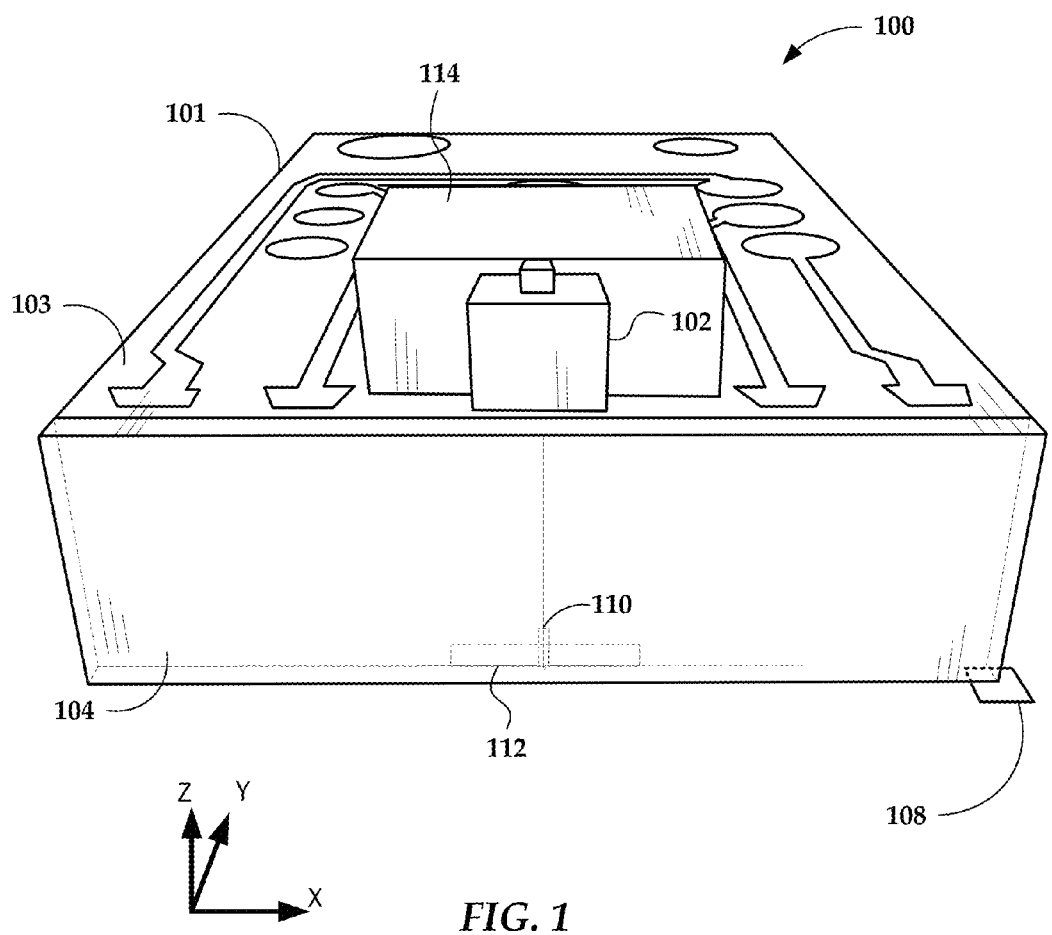
FIG. 1 is a block diagram of a hard drive slider and media arrangement according to an example embodiment.

The present disclosure relates to waveguides that efficiently couple light to NFTs having particular configurations. While this is described in the context of HAMR recording, such waveguides and NFTs may have uses besides HAMR recording and the description of HAMR devices is not meant to be limiting. In reference to FIG. 1, a perspective view shows a HAMR read/write head 100 according to an example embodiment. The read/write head 100 includes a laser diode 102 located on an input surface 103 of a slider body 101. In this example, the input surface 103 is a top surface, which is located opposite to a media-facing surface 108 that is positioned over a surface of a recording media (not shown) during device operation. The media-facing surface 108 is held proximate to the moving media surface while reading and writing data. The media-facing surface 108 may be configured as an air-bearing surface that maintains separation from the media surface via a thin layer of gas, such as air or helium.

The laser diode 102 delivers light to an NFT 112 via a waveguide 110, which is located near the media-facing surface 108. The NFT 112 emits energy used to heat the recording media as it passes by the read/write head. Optical coupling components, such as the waveguide 110 and NFT 112, are formed integrally within the slider body 101 (near a trailing edge surface 104, in this example) and function as an optical path that delivers energy from the laser diode 102 to the recording media.

The laser diode 102 in this example is shown as coupled to the slider body 101 via a submount 114. The submount 114 can be used to orient and affix an edge-emitting laser so that its output is directly downwards (negative z-direction in the figure). The input surface 103 of the slider body 101 may include a facet, mirror, grating or other coupling features near the waveguide 110 to receive light from the laser diode 102.

Figure 2:
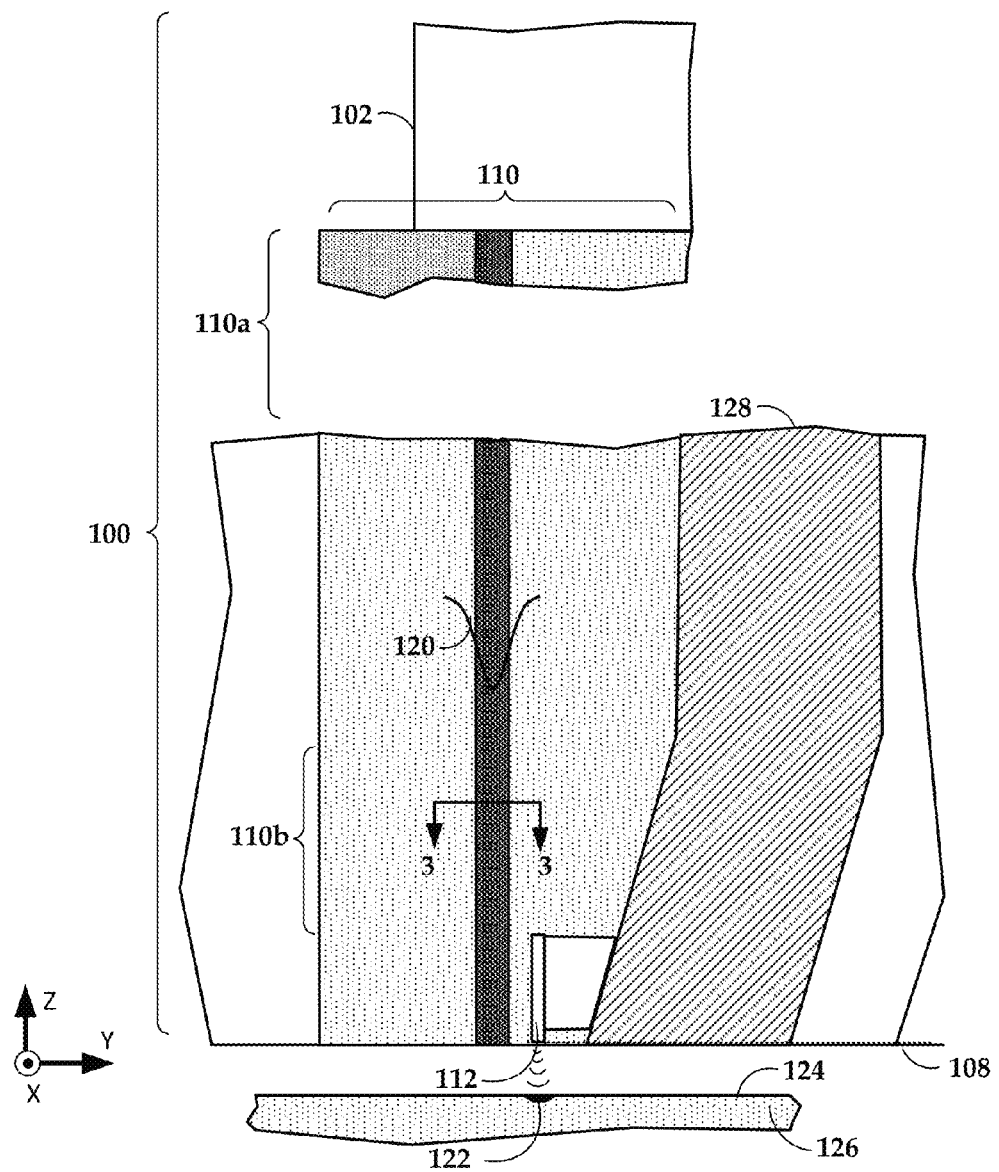
FIG. 2 is a cross sectional view near the media-facing surface of the hard drive slider of FIG. 1.

In FIG. 2 a cross-sectional diagram shows additional components of the read/write head 100 proximate the media-facing surface 108. A laser coupling region 110a of waveguide 110 receives electromagnetic energy 120 from the laser diode 102. The laser coupling region 110a may be formed integrally with waveguide 110 or include a separate waveguide structure. Near the media-facing surface 108, the waveguide 110 couples the energy 120 to the near-field transducer 112 at an NFT coupling region 110b of the waveguide 110. The near-field transducer 112 is made of a metal (e.g., gold, silver, copper, alloys thereof, etc.) that achieves surface plasmonic resonance in response to the applied energy 120. The near-field transducer 112 shapes and transmits the energy 120 to create a small hotspot 122 on a surface 124 of recording medium 126.

A magnetic write pole 128 is magnetically coupled to an electrical coil (not shown). Energizing the coil causes changes in magnetic flux through the write pole 128, which changes a magnetic orientation of the hotspot 122 as it moves past the write pole 128 in the downtrack direction (y-direction). A reader stack (not shown) may also be located near the media-facing surface 108, typically in a down track direction relative to the write pole 128.

Figure 3:
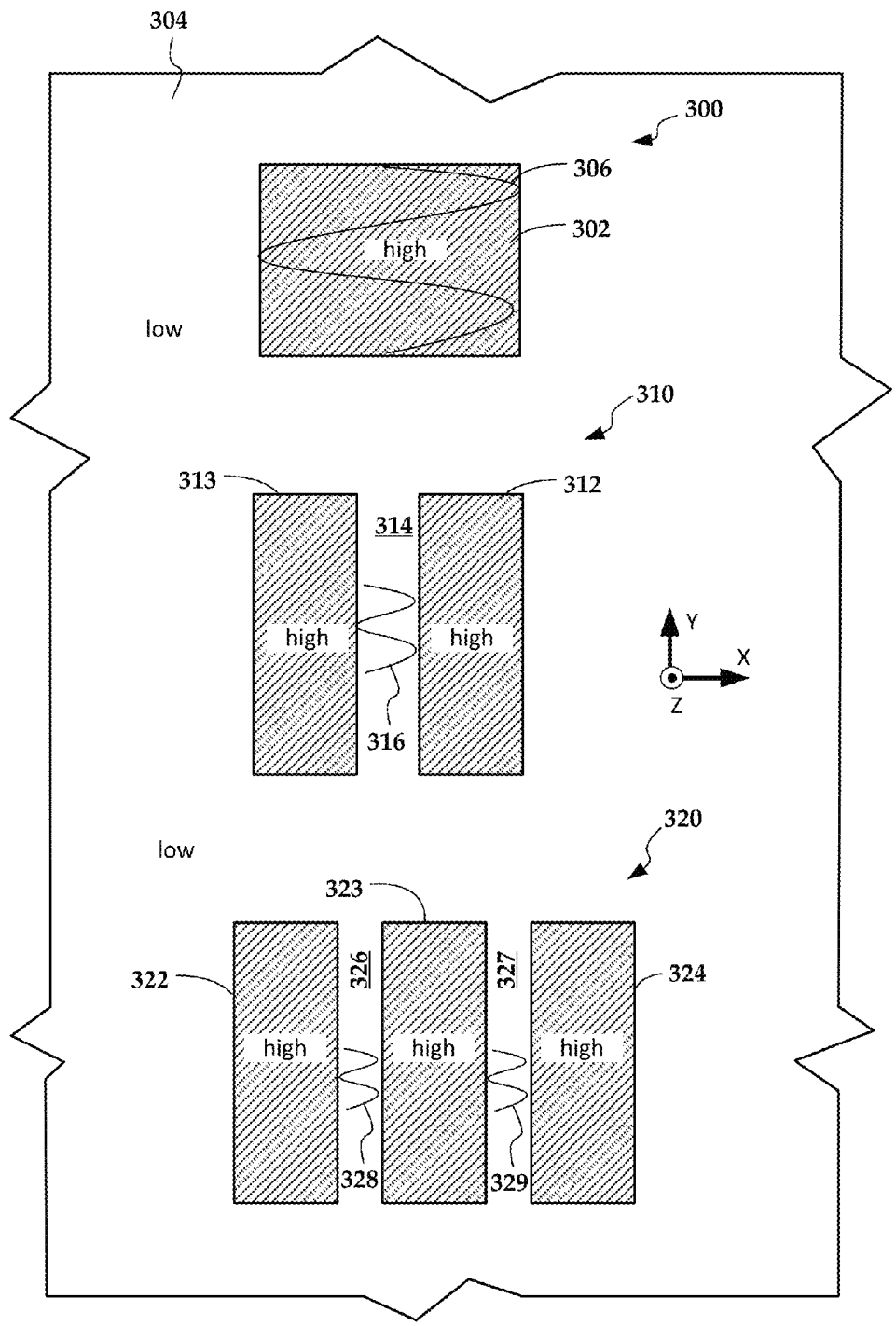
FIG. 3 is a cross-sectional view of waveguide configurations according to example embodiments.

In FIG. 3, a cross-sectional diagram illustrates example waveguides that may be used to deliver light to an NFT such as NFT 112 in FIG. 2. The cross-section in FIG. 3 is taken parallel to the media-facing surface 108 in the NFT coupling region 110b, as indicated, for example, by Section 3-3 in FIG. 2. Waveguide configuration 300 is often used for this type of light delivery, and includes a high-index of refraction (n) material 302 that is surrounded by lower index material 304. Light 306 propagates through high-index material 302 in the z-direction of the illustrated coordinate system.

Waveguide configuration 310 is sometimes referred to as a gap waveguide. In this configuration 310, the waveguide includes two regions 312, 313 of high-index material separated by a gap 314 of low-index material. The gap waveguide configuration 310 is different from the standard configuration 300 by not only the two regions 312, 313 of the high-index material, but by the way light 316 mainly propagates through the low-index gap 314 instead of the high-index regions 312, 313.

While the gap 314 is shown filled by the same low-index material 304 shown surrounding the other waveguide configurations, it will be understood that different low-index materials may be used for all the waveguide configurations and regions therein. For purposes of this disclosure, the term "low-index" material is intended to indicate a value of n that is low relative to the high-index material, and is not intended to limit the low-index or high-index materials to any specific material or material property.

A dual-slot waveguide configuration 320 is similar to waveguide 310, except that waveguide configuration 320 includes two, low-index, light-propagating regions 326, 327 that are surrounded on inner and outer sides by high-index material regions 322-324. Light 328, 329 propagates through the regions 326, 327 in the z-direction. Light is emitted from the low-index, light-propagating regions 326, 327 where in can be used, for example, to excite an NFT (e.g., NFT 112 in FIGS. 1 and 2). Dual-slot waveguides used with NFTs according to example embodiments are shown in the cross-sectional diagrams of FIGS. 4 and 5.

Figure 4:
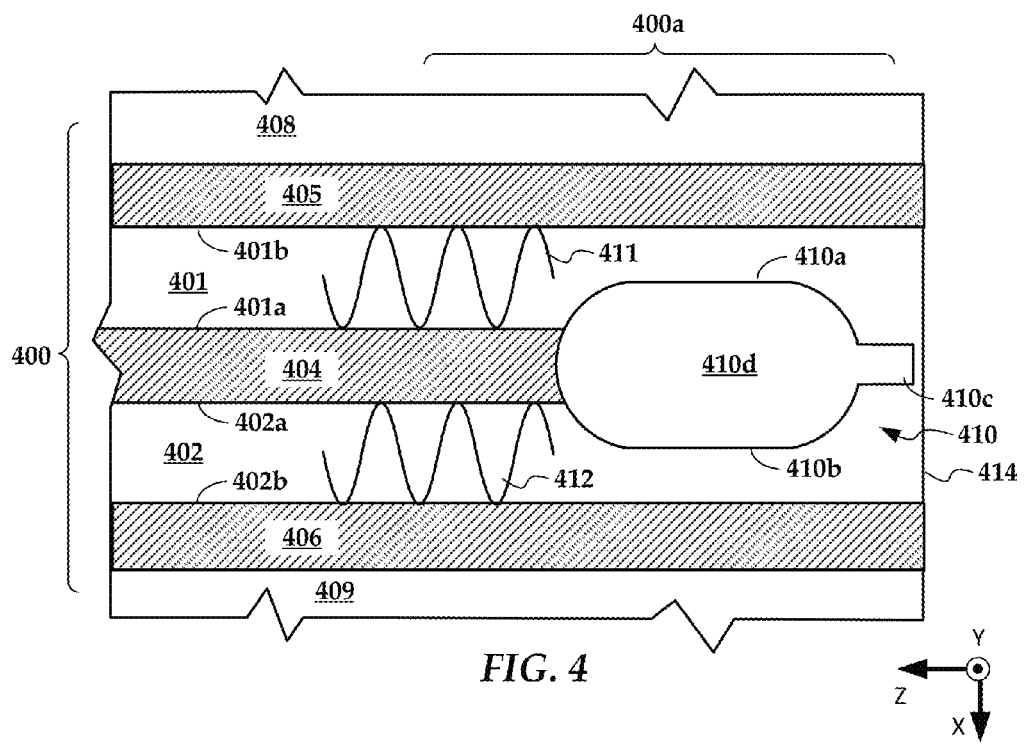
FIGS. 4 and 5 are plan views of a waveguide interfacing with an near-field transducer according to example embodiments.

In FIG. 4, a dual-slot waveguide 400 includes first and second light propagating regions 401, 402 of first and second low-index materials. The first and second low-index materials may be the same, different and/or have same or different indices of refraction. The first and second light propagating regions 401, 402 are located side-by-side in a direction (e.g., x-direction) normal to a light propagation direction (e.g., negative z-direction).

Inner sides 401a, 402a of the first and second light propagating regions 401, 402 are separated by at least one first region 404 of a first high-index material. Second and third regions 405, 406 of a second high-index material surround outer sides 401b, 402b of the first and second light propagating regions 401, 402. The first and second high-index materials may be the same, different and/or have same or different indices of refraction. Similarly, the second and third regions 405, 406 may be made of different materials or similar materials with different indices of refraction. The second and third regions 405, 406 are surrounded by third and fourth low-index materials 408, 409, which may be the same as or different from the first and second low-index materials of the light propagating regions 401, 402.

A near-field transducer 410 is shown proximate an output end 400a of the dual-slot waveguide 400. The near-field transducer 410 includes an enlarged portion 410d and a peg 410c that extends towards a media-facing surface 414. First and second sides 410a, 410b of the near-field transducer 410 receive respective first and second portions 411, 412 of energy from the first and second light propagating regions 401, 402. The first and second portions 411, 412 are concentrated on the first and second sides 410a, 410b of the near-field transducer 410, which induces surface plasmonic resonance. The surface plasmons are directed out the media-facing surface 414 via the peg 410c. The enlarged portion 410d of near-field transducer 410 is shaped as an elongated rectangle with rounded sides and ends, also referred to as a stadium shape. The peg 410c protrudes from one of the rounded ends of the enlarged portion 410d.

The energy 411, 412 is coupled into the dual slot waveguide via a coupling waveguide (not shown) that is located away from the media-facing surface 414. Details of a coupling waveguide are provided below. Generally, the coupling waveguide is configured to receive energy from a laser diode and cause the first and second portions 411, 412 of the energy to propagate along the first and second light propagating regions 401, 402. The coupling waveguide and/or first and second light propagating regions 401, 402 may also cause changes to one or both of the first and second portions 411, 412 of the energy, such as change a polarity, propagation mode (e.g., transverse electric, transverse magnetic), phase, etc. The first and second light propagating regions can be between 100 nm and 400 nm in width (x-direction), making the waveguide 400 reasonably manufacturable. The various features of the waveguide, including the low-index propagation regions 401, 402 and high index regions 404-406 can be patterned using techniques know in the art, e.g., photolithographic etching, layer deposition, etc.

Figure 5:
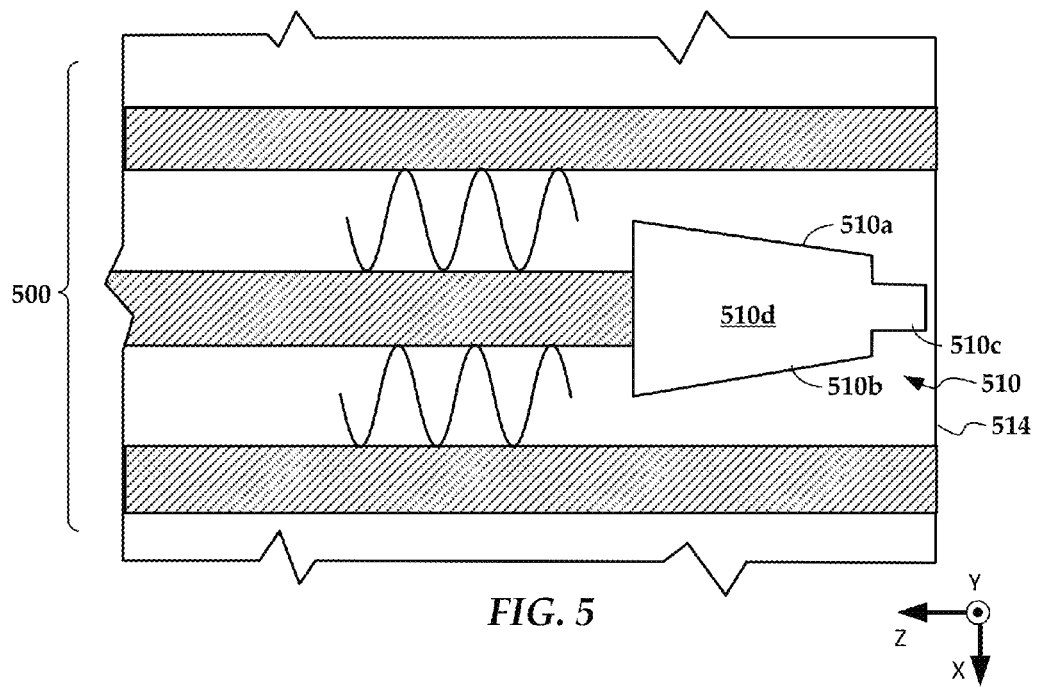

In FIG. 5, a dual-slot waveguide 500 includes features similar to those described for dual-slot waveguide 400 in FIG. 4. As with the previous example, a near-field transducer 510 is located near a media-facing surface 514. In this example, an enlarged portion 510d of the near-field transducer 510 has a trapezoidal shape with sloping linear first and second sides 510a, 510b that result in a narrower cross-track width near the media-facing surface 514. A peg 510c protrudes from the narrow end of the enlarged portion 510d of the near-field transducer 510 towards the media-facing surface 514.

While the waveguides 400, 500 appear similar in the figures, in practice the waveguides 400, 500 may have significantly different properties to in order to efficiently excite the differently-shaped near-field transducers 410, 510. The different waveguide properties may include, but are not limited to, different materials, waveguide geometry (including bending or curvature), relative position of the near-field transducer and waveguide layers along the y-direction, termination distance from the near-field transducer and/or media-facing surface, etc. Examples of these different waveguide properties are discussed below in regards to FIGS. 10-13. The example near-field transducer shapes in FIGS. 4 and 5 are not intended to be exhaustive. Generally, a dual-slot waveguide may be used for any near-field transducer that has opposing sides/edges that can be efficiently excited by first and second portions of energy (e.g., the portions having different properties) directed to both of the opposing sides. For example, an elongated peg, with either constant or tapered cross-section as it approaches the media-facing surface may be used with waveguide systems shown herein.

Figure 6:
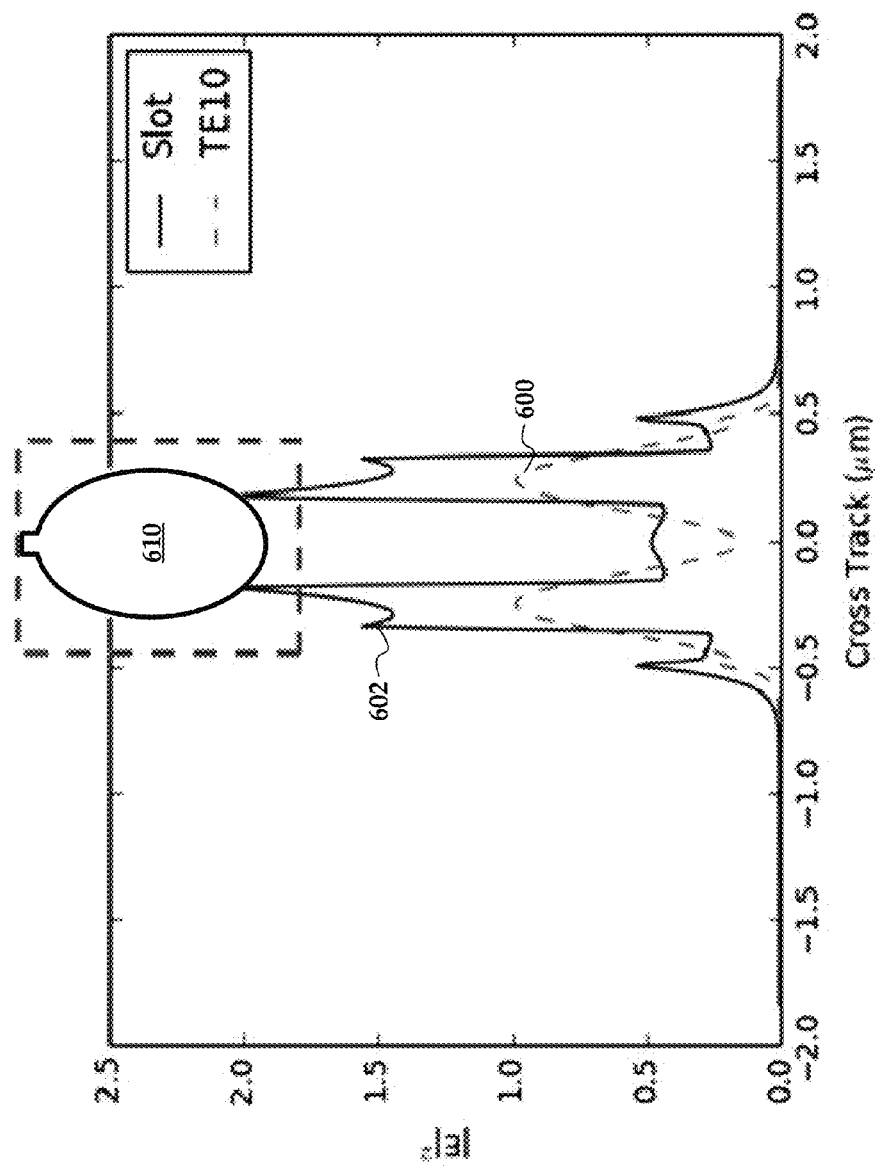
FIG. 6 is a graph showing modeling results for a dual-slot waveguide according to an example embodiment.

Properly configured, the dual-slot waveguide can maximize the excitation field near the sides/edges of a near-transducer. By concentrating the input field near the sides/edge, the excitation can be more efficient. An example of this is shown in the graph of FIG. 6, which shows modeling results for a dual-slot waveguide and a conventional, high-index, single core waveguide.

Dashed curve 600 represents optical power at the near-field transducer as a function of cross-track location for a conventional waveguide (e.g., waveguide configuration 300 in FIG. 3) which delivers the light in first-order transverse electric mode ($TE_{10}$). Curve 602 represents the field strength of a dual-slot waveguide as a function of cross-track location near the near-field transducer. An example geometry of a near-field transducer 610 that may be excited by either of the fields is shown superimposed over the graph of FIG. 6.

Note the $TE_{10}$ field from the conventional waveguides has a Gaussian peak spread, resulting in full-width at half-maximum (FWHM) at 0.5*wavelength. In contrast, the slot waveguide guides light in <0.5 wavelength dimension resulting in a larger concentration of light (e.g., narrow maximum peak width) at the edges of the near-field transducer 610. This concentration of light energy makes the dual-slot waveguide useful for exciting near-field transducers of various shapes. Note also that the asymmetric peaks of the curve 602, which may be tuned by varying various waveguide parameters as noted above (e.g., geometry, materials). When two modes ($TE_{10}$ and double-slot) are carrying the same amount of power, the field intensity maximum will be higher for double slot waveguides (~2:1 in the example above).

Figure 7:
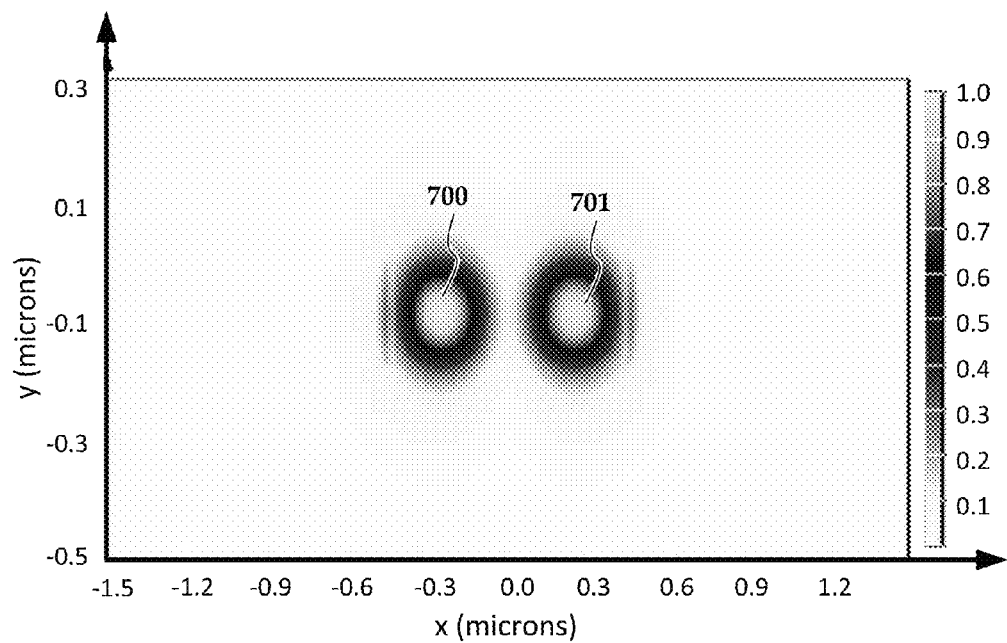
FIGS. 7 and 8 are plots showing modeling results for a conventional and dual-slot waveguide according to an example embodiment.
Figure 8:
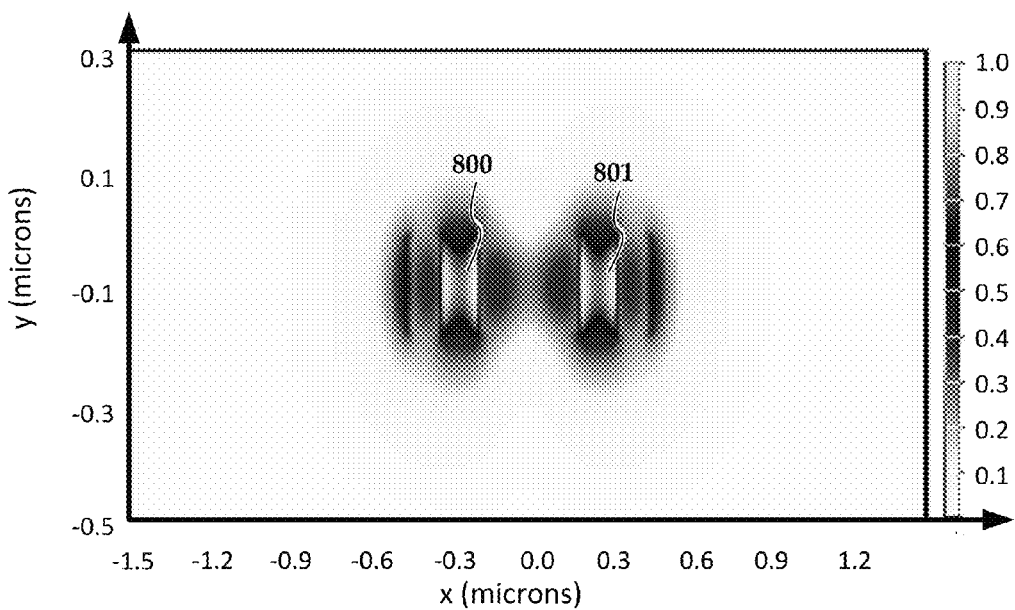

The graphs of FIGS. 7 and 8 represent normalized field power for the conventional and dual-slot waveguides, respectively. The power in both graphs is shown as a two-dimensional plot on a plane parallel with the media-facing surface, with the x-direction being crosstrack and the y-direction being downtrack. The white regions 700, 701 in FIG. 7 and white regions 800, 801 in FIG. 8 represent the highest value (1.0) of normalized power, while the surrounding white regions represent the lowest (0.0) normalized power. The regions 800, 801 are concentrated in narrower cross-track dimension than regions 700, 701, resulting in higher concentration of energy on sides of a near-field transducer.

Figure 9:
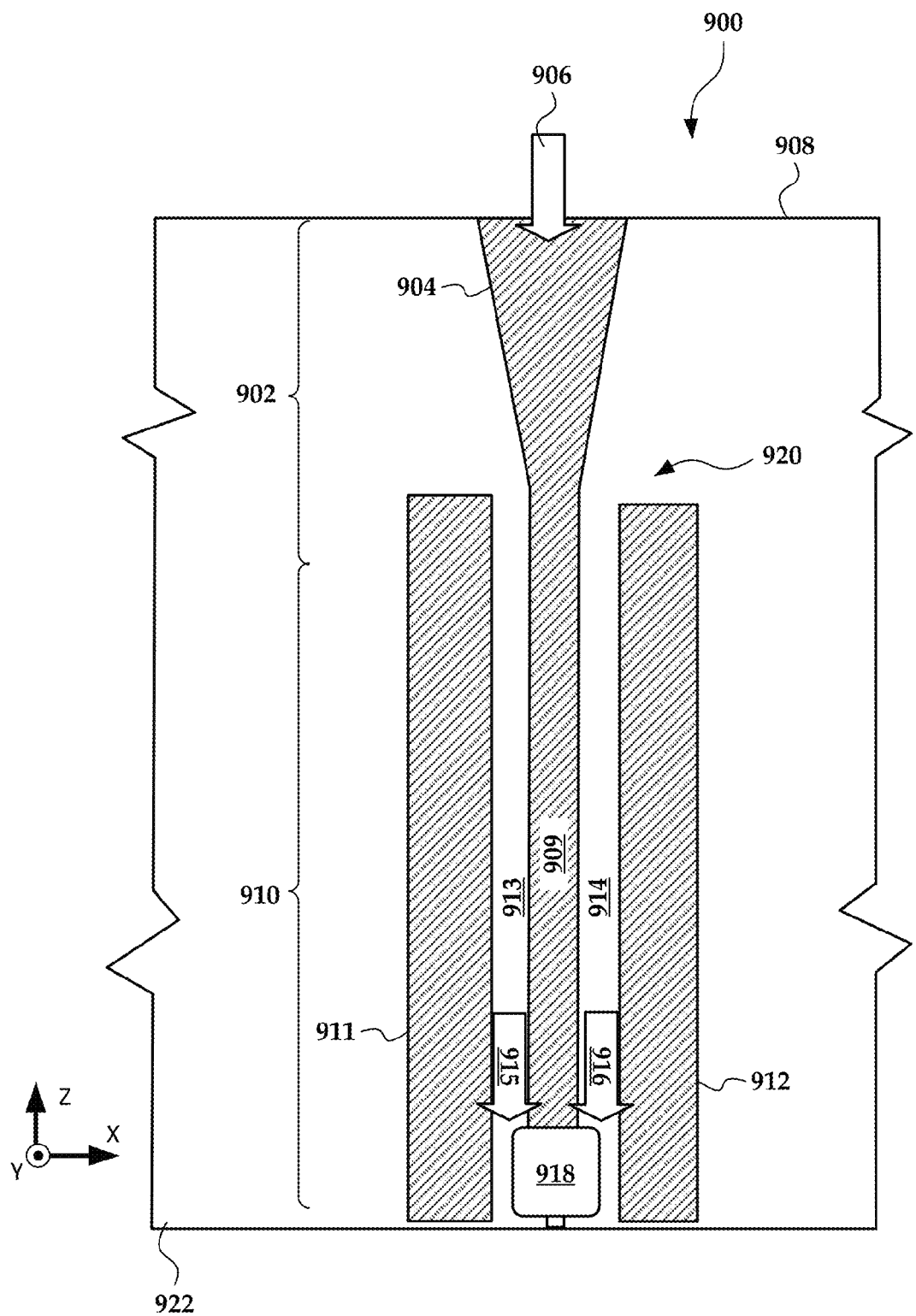
FIG. 9 is a diagram illustrating a coupling waveguide according to an example embodiment.

As noted above, a read/write head or other apparatus utilizing the dual-slot waveguide may include a coupling structure that receives light from a source (e.g., a laser diode) and cause the light to propagate through the low-index slot regions. In FIG. 9, a cross-sectional diagram illustrates a coupling waveguide 902 of an apparatus 900 according to an example embodiment. The coupling waveguide 902 includes a tapered region 904 of high index material that receives light 906 at an input surface 908 of the apparatus 900. The input surface 908 may include a top surface of a read/write head, for example, upon which a laser may be mounted (not shown).

The tapered portion 904 transitions to a constant cross-section portion 909 of high-index material that is part of a dual-slot waveguide 910. The dual-slot waveguide 910 also includes two other high-index regions 911, 912 separated from the first high index portion 909 via low-index gaps 913, 914. The coupling waveguide 902 causes the incoming light 906 to be separated into two portions 915, 916 that propagate along the low-index gaps 913, 914 and couple into opposing edges of a near-field transducer 918. The near-field transducer 918 is located near a media-facing surface 922 and achieves surface plasmon resonance in response to the portions 915, 916 of light energy.

A dual-slot waveguide configuration such as shown in FIG. 9 causes a mode profile of the light near the index discontinuity region 920 to be changed from sine-like profile from the input coupler 902 (e.g., as shown in FIG. 7) to cosh-like profile exiting the dual-slot waveguide (e.g., as shown in FIG. 8). The modal field profile will decay from interface inside the low-index regions 913, 914 because the effective index is larger than the low-index but smaller than that of the high index regions 909, 911, 912. The highest local energy density overlaps with interface located between 911 and 913 or 913 and 909, as well as 912 and 914 or 914 and 909 according to the field symmetry. For fields normal to the x-direction, the E-field difference/enhancement follows the boundary conditions for electric displacement and therefore the $D_X$ continuity, which yields $E_{low}/E_{high} \sim (n_{high}/n_{low})^2$.

Figure 10:
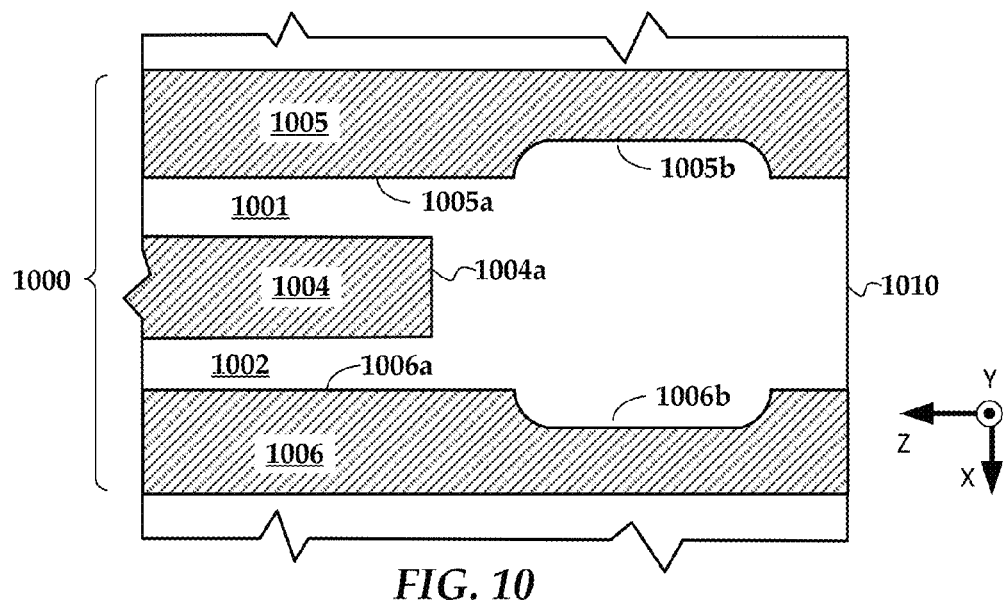
FIGS. 10-13 are cross-sectional plan views of a waveguide output end according to example embodiments.

In FIGS. 10-13, cross-sectional plan views show details of output ends of dual-slot waveguides according to example embodiments. In these figures, output ends of waveguides 1000, 1100, 1200, and 1300 are shown near a media-facing surface, where they are coupled to sides of a near-field transducer. The near-field transducer in these figures is not shown, but may include any geometry shown and/or described herein, and may be overlaid on the output ends of the waveguides 1000, 1100, 1200, and 1300 either at, above or below the x-z cross-sectional planes of FIGS. 10-13. The coordinate system shown in FIG. 10 is also applicable to FIGS. 11-13.

In FIG. 10, dual-slot waveguide 1000 includes first and second light propagating regions 1001, 1002 formed of one or more low-index materials. Inner sides of the first and second light propagating regions 1001, 1002 are separated by at least one first region 1004 of a high-index material. Second and third regions 1005, 1006 of a high-index material surround outer sides of the first and second light propagating regions 1001, 1002. Inner sides 1005a, 1006a of the second and third high-index regions 1005, 1006 include indentations 1005b, 1006b (e.g., rounded depressions) which surround a near-field transducer proximate a media-facing surface 1010. The indentations in this and other figures are shown as symmetric about a centerline of the first region 1004, although other variations are possible, e.g., asymmetric about the centerline. An end 1004a of the first high-index region 1004 does not extend to the rounded indentations 1005b, 1006b.

Figure 11:
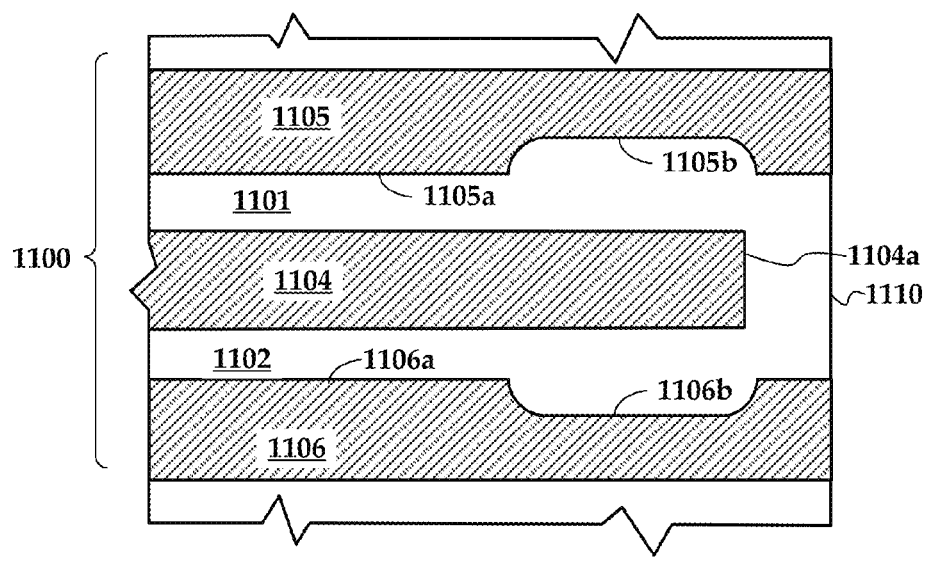

In FIG. 11, dual-slot waveguide 1100 includes first and second light propagating regions 1101, 1102 formed of one or more low-index materials. Inner sides of the first and second light propagating regions 1101, 1102 are separated by at least one first region 1104 of a high-index material. Second and third regions 1105, 1106 of a high-index material surround outer sides of the first and second light propagating regions 1101, 1102. Inner sides 1105a, 1106a of the second and third high-index regions 1105, 1106 include indentations 1105b, 1106b which surround a near-field transducer proximate a media-facing surface 1110. An end 1104a of the first high-index region 1104 extends at least partially between the rounded indentations 1105b, 1106b.

Figure 12:
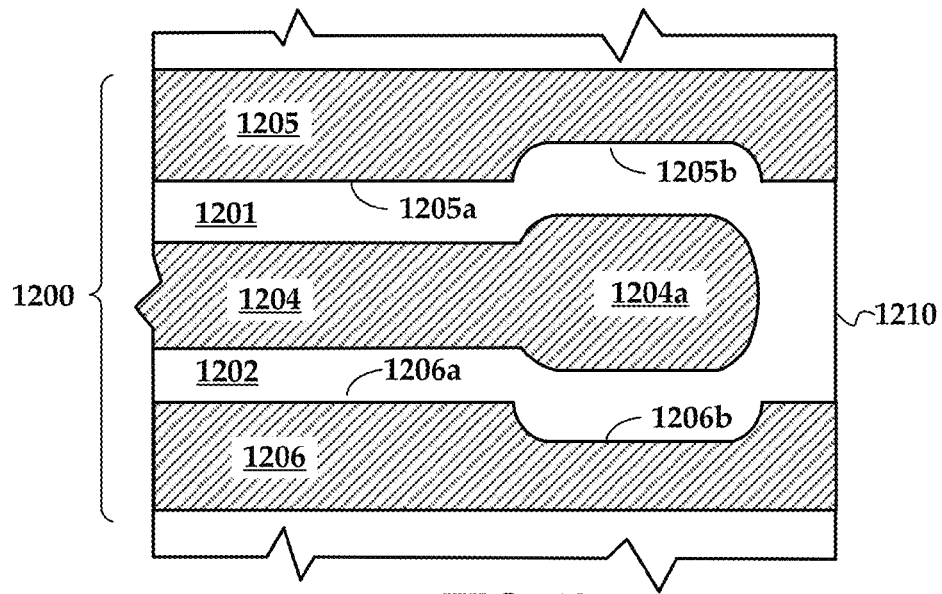

In FIG. 12, dual-slot waveguide 1200 includes first and second light propagating regions 1201, 1202 formed of one or more low-index materials. Inner sides of the first and second light propagating regions 1201, 1202 are separated by at least one first region 1204 of a high-index material. Second and third regions 1205, 1206 of a high-index material surround outer sides of the first and second light propagating regions 1201, 1202. Inner sides 1205a, 1206a of the second and third high-index regions 1205, 1206 include indentations 1205b, 1206b which surround a near-field transducer proximate a media-facing surface 1210. An end 1204a of the first high-index region 1204 is enlarged and extends at least partially between the rounded indentations 1205b, 1206b.

Figure 13:
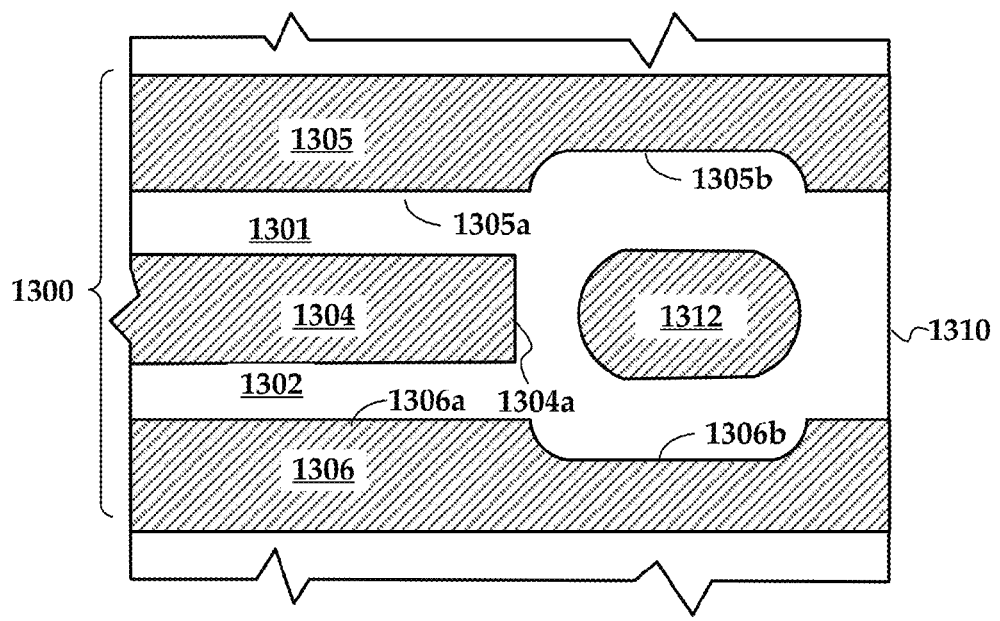

In FIG. 13, dual-slot waveguide 1300 includes first and second light propagating regions 1301, 1302 formed of one or more low-index materials. Inner sides of the first and second light propagating regions 1301, 1302 are separated by at least one first region 1304 of a high-index material. Second and third regions 1305, 1306 of a high-index material surround outer sides of the first and second light propagating regions 1301, 1302. Inner sides 1305a, 1306a of the second and third high-index regions 1305, 1306 include indentations 1305b, 1306b which surround a near-field transducer proximate a media-facing surface 1310. An end 1304a of the first high-index region 1304 does not extend between the rounded indentations 1305b, 1306b. An island region 1312 of high-index material is enlarged relative to the first high index region 1304 and is disposed between the rounded indentations 1305b, 1306b. The island region 1312 is isolated from the end 1304a of the first high-index region 1304 by a low-index material.

Figure 14:
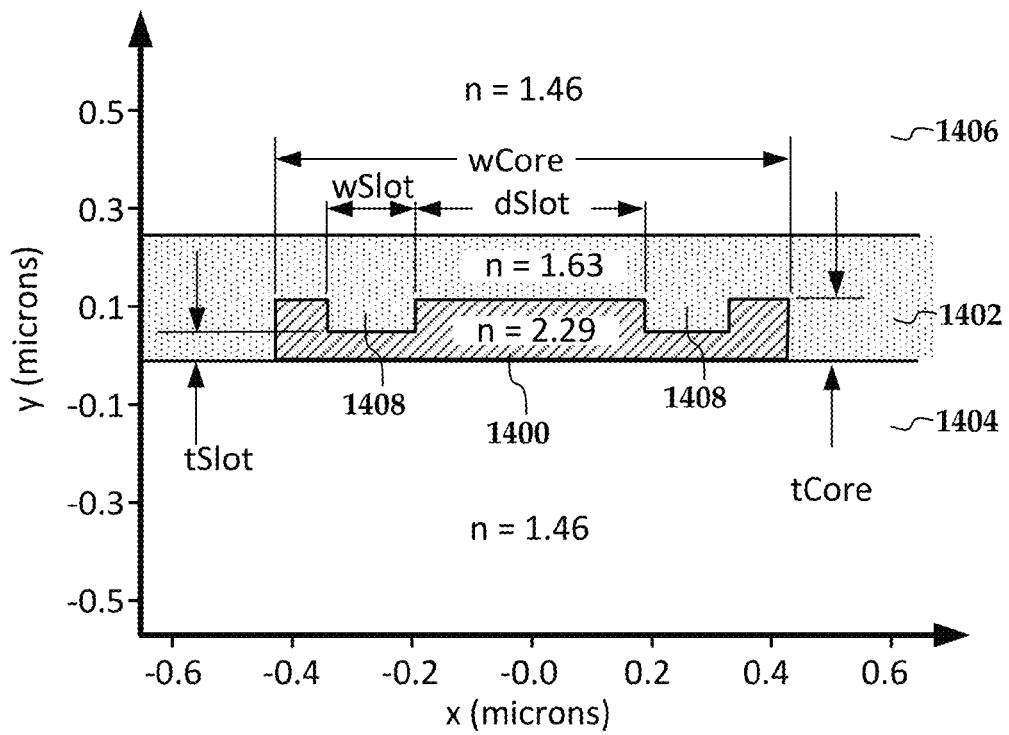
FIGS. 14 and 15 are cross-sectional views illustrating a dual-slot waveguide configuration according to additional embodiments.
Figure 15:
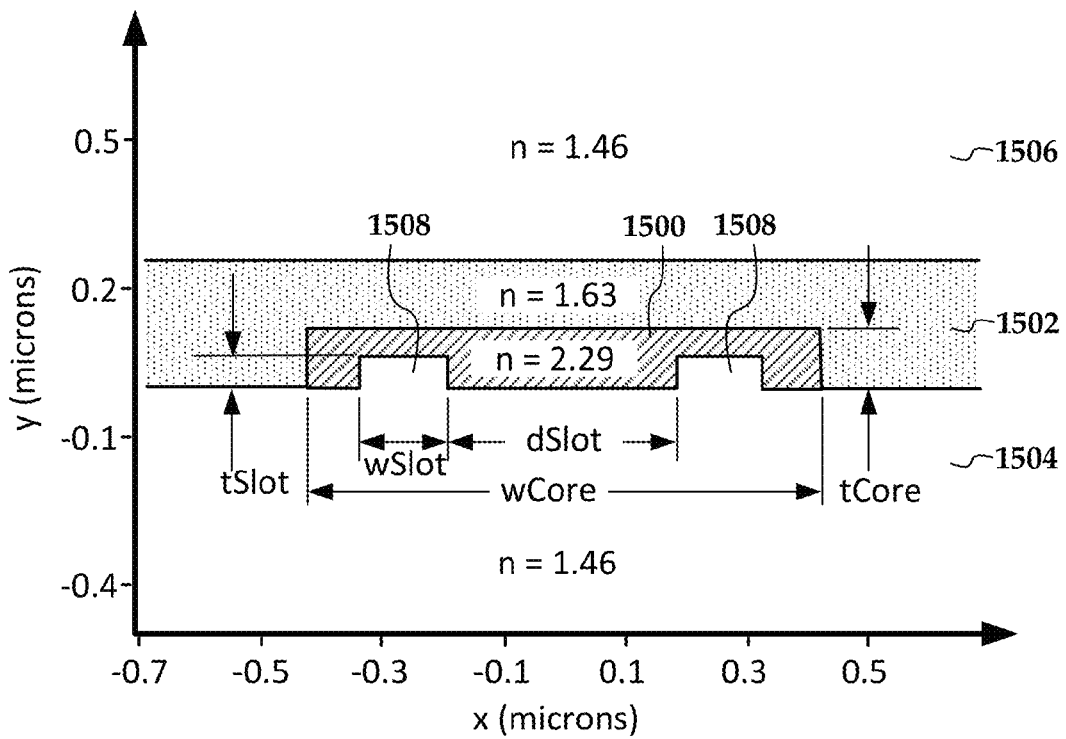

In FIGS. 14 and 15, cross-sectional views illustrate a slot waveguide configuration according to additional embodiments. Both cross sectional views correspond to a view normal to the light propagation direction, e.g., corresponding to an xy-plane as shown in the cross-sectional views of FIG. 3. In FIG. 14, a channel of high-index material 1400 is surrounded on either side by lower-index material layers 1402, 1404. Another low-index layer 1406 is on top of layer 1402. Both layers 1404 and 1406 may be considered top and bottom cladding layers.

In a conventional waveguide (e.g., where light primarily propagates through the high index region 1400), the high index region 1400 would correspond to the core, the layer 1402 would correspond to a side cladding layer, and the layers 1404 and 1406 would correspond to bottom and top cladding layers. Note that the cladding layer 1402 has a higher refractive index than layers 1404 and 1406. In this case, the high-index material 1400 has slots 1408 running normal to the page (z-direction in this case), and light propagates through these slots.

In FIG. 15, a high-index material 1500 is surrounded on either side by lower-index material layers 1502, 1504. Another low-index layer 1506 is on top of layer 1502. As with FIG. 14, the middle cladding layer 1502 has a higher refractive index than layers 1504 and 1506. Similarly, the high-index material 1500 has slots 1508 running normal to the page (z-direction in this case), along which light propagates. However, in this case, the slots are facing the lower index material of layer 1504.

Figure 16:
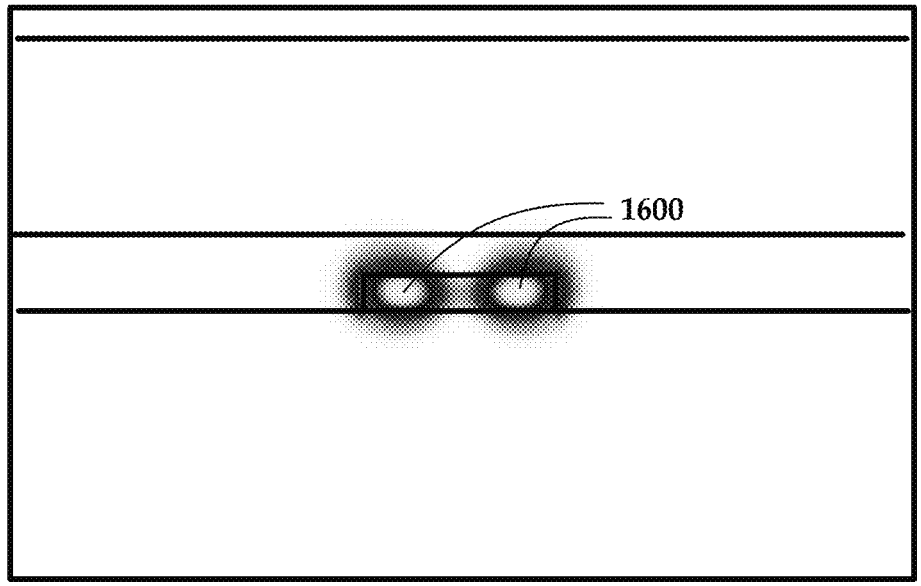
FIGS. 16-18, contour plots illustrating analysis results for waveguide configurations as shown in FIGS. 14 and 15.
Figure 17:
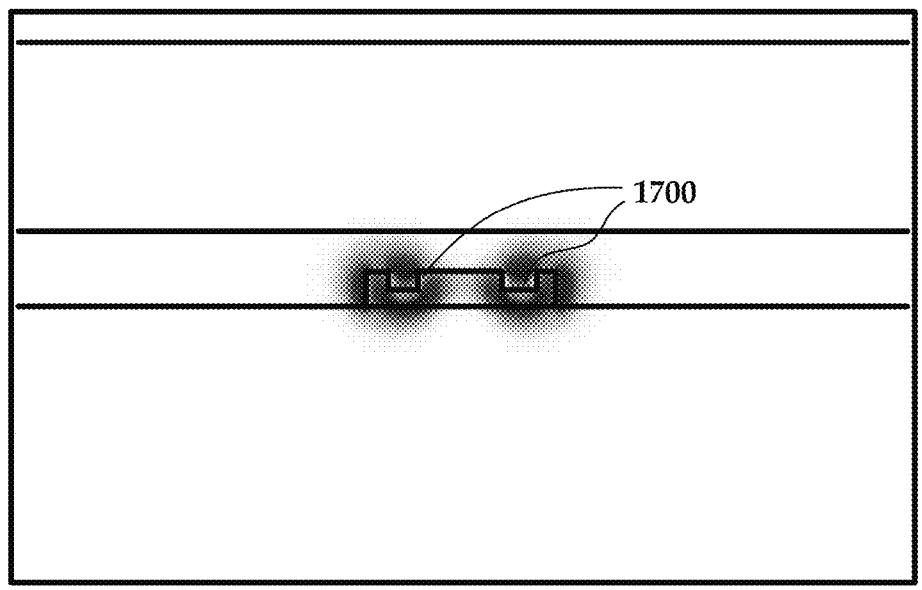
Figure 18:
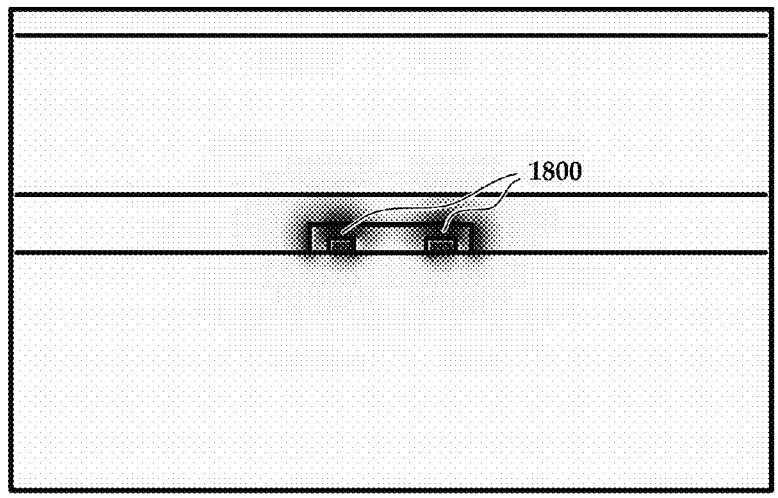

In FIGS. 16-18, contour plots illustrate analysis results for waveguide configurations as shown in FIGS. 14 and 15. In FIG. 16, a plot shows a $TE_{10}$ E-field profile for a conventional waveguide (e.g., similar to FIGS. 14 and 15 but without the slots) having a 120 nm thick core (corresponding to tCore in FIGS. 14 and 15) of n=2.20, a 138 nm thick side cladding layer of n=1.63, and top and bottom cladding layers of n=1.46. This type of profile may be seen in at/after input coupler 902 shown in FIG. 9 before the light is coupled into the slot waveguide. Peak intensity is in lightly-shaded areas 1600. The effective index is 1.65 and the thermal gradient at the media is 3.989 K/nm using an NFT design such as NFT 410 in FIG. 4.

For the result shown in FIGS. 17 and 18, the respective geometry is as shown in FIGS. 14 and 15 with values of tCore=120 nm, wCore=850 nm, wSlot=140 nm, dSlot=380 nm, and tSlot=60 nm. The peak intensity is lightly shaded areas 1700 and darkly-shaded areas 1800 around the slots in FIGS. 17 and 18. The effective indices are both about 1.57, and the thermal gradient is 4.236 K/nm and 4.574 K/nm for FIGS. 17 and 18, respectively using an NFT design such as NFT 410 in FIG. 4. The latter thermal gradient represents an approximate 15% gain over that of the geometry shown in FIG. 16. Note that these results were obtained with no attempt made to optimize the geometry of the waveguide or NFT.

Figure 19:
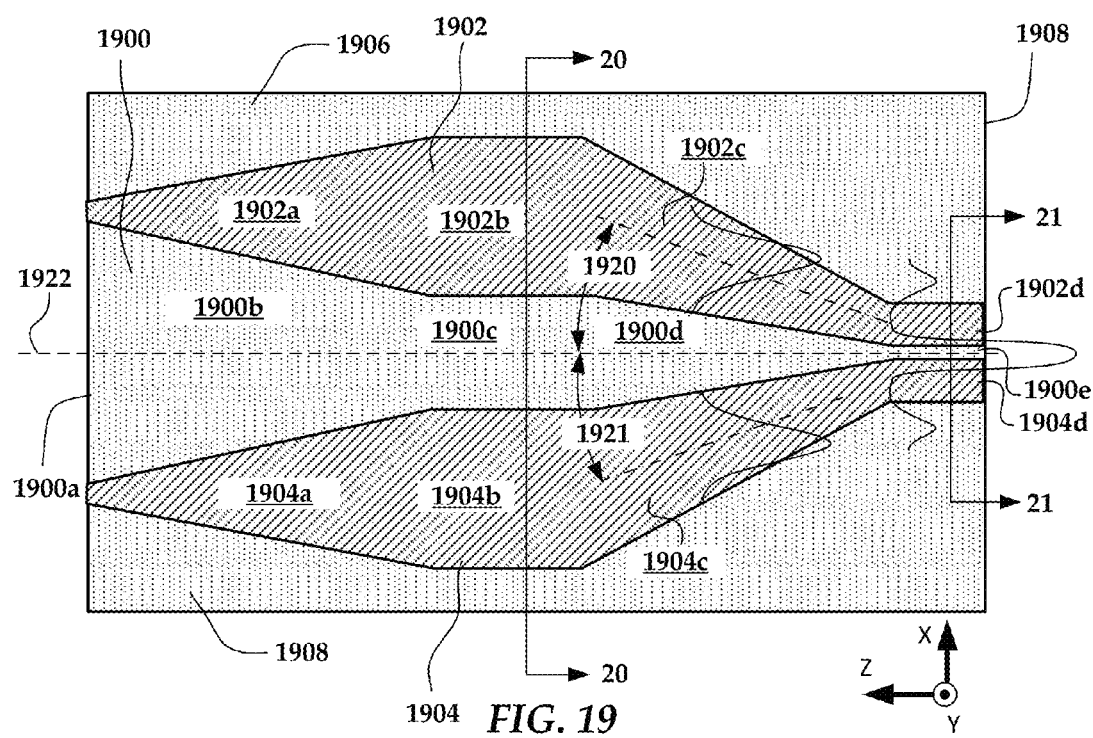
FIG. 19 is a plan view showing a slot waveguide according to another example embodiment.

In FIG. 19, a plan view of a substrate-parallel surface shows a slot waveguide according to another example embodiment. A middle low-index region 1900 is surrounded by high-index regions 1902, 1904 that are further surrounded by low-index regions 1906, 1908. Light is coupled into a first end 1900a of the middle low-index region 1900, which is configured as an input coupler. The high-index regions 1902, 1904 have first tapered portions 1902a, 1904a that taper from a smaller cross-track width to a larger cross-track width as the first tapered portions 1902a, 1904a approach a media-facing surface 1908.

The high-index regions 1902, 1904 have first constant-width portions 1902b, 1904b joined to the first tapered portions 1902a, 1904a. Second tapered portions 1902c, 1904c of the high-index regions 1902, 1904 extend from the first constant width-portions 1902b, 1904b towards the media-facing surface 1908. The second tapered portions 1902c, 1904c have cross-track widths that decrease from where it joins the first constant width-portions 1902b, 1904b to where they join second constant width-portions 1902d, 1904d at the media-facing surface 1908. Note that centerlines of the second tapered portions 1902c, 1904c are also at non-zero angles 1920, 1921 to a light propagation direction 1922, here aligned with the z-axis.

The tapering of the high-index regions 1902, 1904 results in a corresponding tapering of the middle, low-index region 1900. In particular, the middle, low-index region 1900 has input and output tapers 1900b, 1900d that both decrease as they approach the media-facing surface 1908. First and second constant-width regions 1900c, 1900e join the first and second tapered portions 1900b, 1900d as shown in the figure. Generally, the middle, low-index region 1900 forms a single, low-index slot that guides the light towards an NFT that is located in the second constant-width region 1900e. The NFT can be any configuration described herein, e.g., enlarged portion with peg, peg-only, etc.

Figure 20:
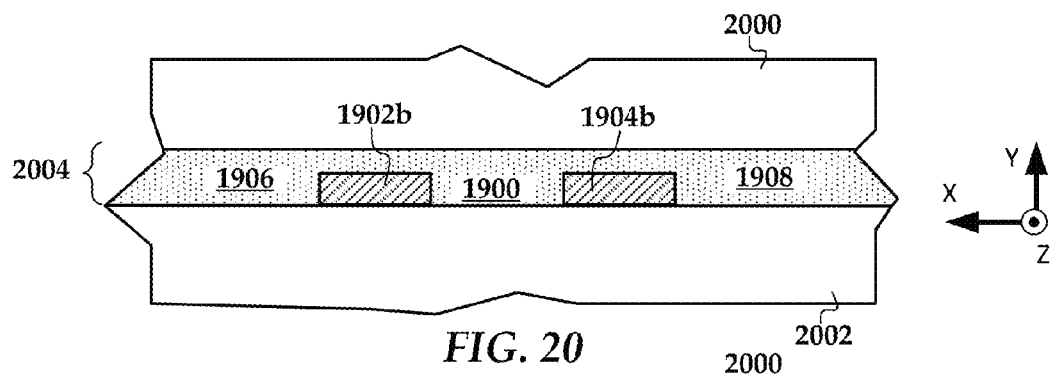
FIGS. 20 and 21 are cross-sectional views corresponding to section lines 20-20 and 21-21 of FIG. 19.
Figure 21:
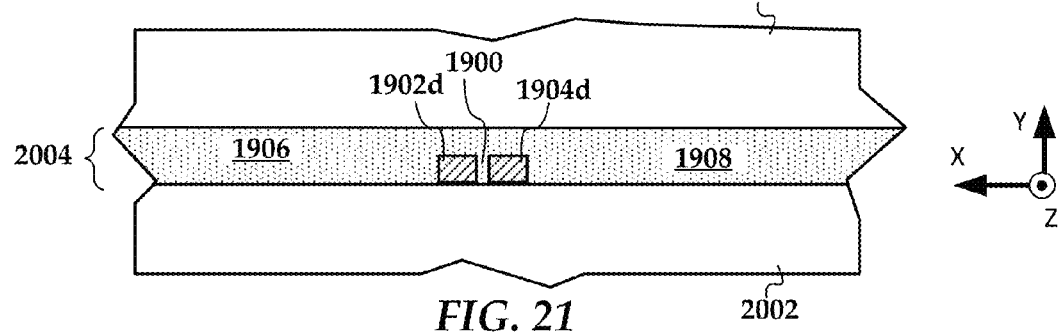
Figure 22:
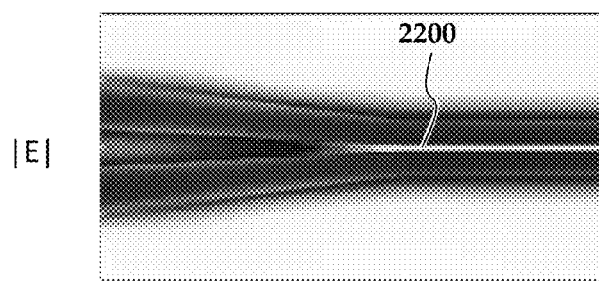
FIGS. 22 and 23 are contour plots of field showing energy analysis results for a slot waveguide according to an example embodiment.

In FIGS. 20 and 21, diagrams show cross-section views that respectively correspond to section lines 20-20 and 21-21 of FIG. 19. As shown in FIG. 20, the constant-width portions 1902b, 1904b of the high-index regions are formed of a high-index material that is etched into a layer 2004 of material that has an index of refraction lower than that of the constant-width portions 1902b, 1904b, but higher than that of top and bottom cladding layers 2000, 2002. These same layers 2000, 2002, 2004 extend to the cross-section shown in FIG. 21.

Although this waveguide has two high-index channels, the light propagates through the low-index middle region 1900. An analysis was performed on this configuration according to an example embodiment, and the results shown in FIG. 23-27.

Figure 23:
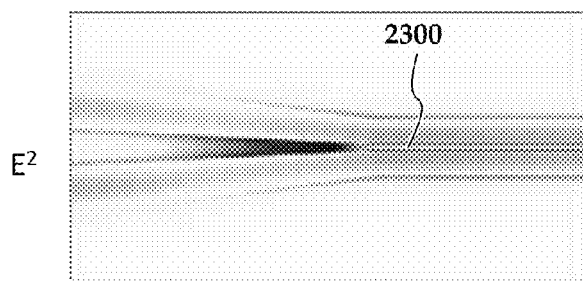
Figure 24:
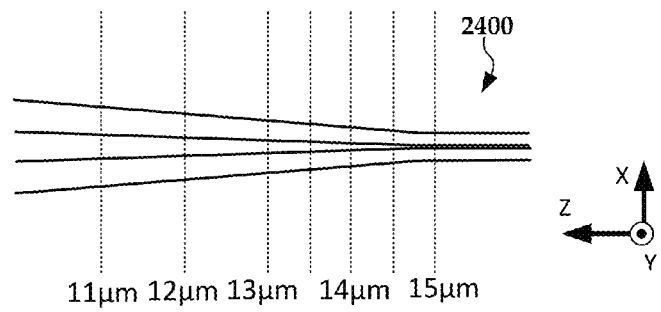
FIG. 24 is a diagram showing cross-sections along a tapered slot waveguide according to an example embodiment.

In FIGS. 23 and 24, shows the field magnitude (|E|) and energy ($E^2$) near the junction between the second tapered portions and the second straight portions. The maximum field and energy are shown by lightly shaded regions 2200 and 2300, respectively, within the low-index gap between the straight portions.

Figure 25:
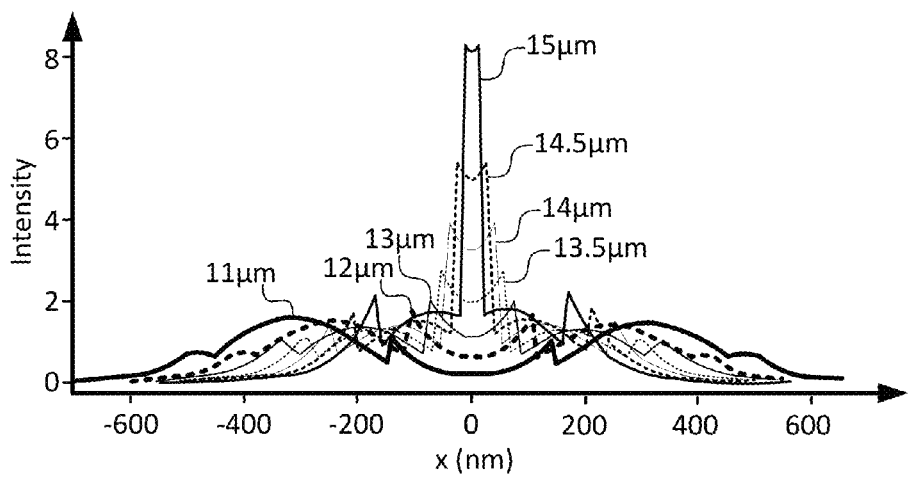
FIG. 25 is a graph showing change in intensity profile along the length of a waveguide according to an example embodiment.
Figure 26:
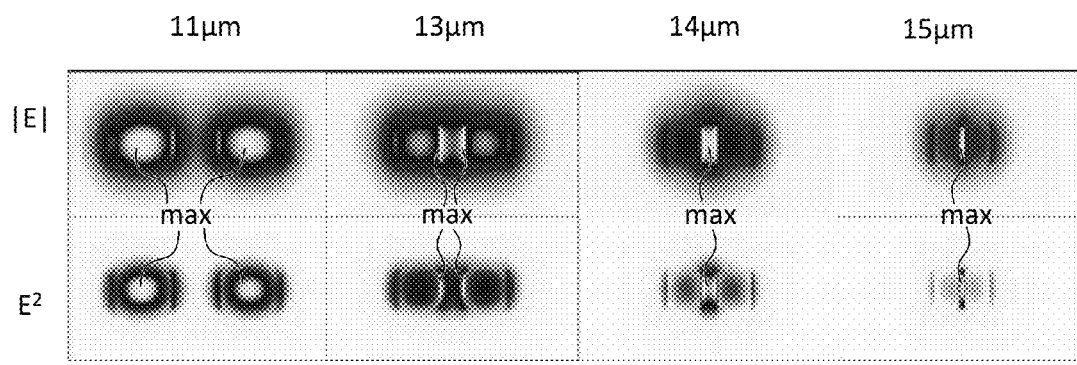
FIG. 26 is a series of contour plots showing magnitude and power along planes of a waveguide according to an example embodiment.

In FIG. 24, a diagram shows cross sections along a tapered slot waveguide 2400 that were analyzed to provide the results shown in FIGS. 25 and 26. In FIG. 25, a graph shows the change in intensity profiles along the length of the waveguide 2400 as a function of cross-track location. The tapering of the low-index, middle section pushes the intensity profile to have a sharp peak at the cross-track centerline where the NFT is located. This may be useful for certain NFT configurations, such as an elongated peg that is aligned longitudinally (e.g., along the light propagation direction) in the output portion of the waveguide. The contour plots in FIG. 26 show magnitude and power on the xy-plane. The field changes shape from that similar to a conventional channel waveguide at 11 μm (e.g., as seen in FIG. 16) to a sharply concentrated stripe at 15 μm.

Figure 27:
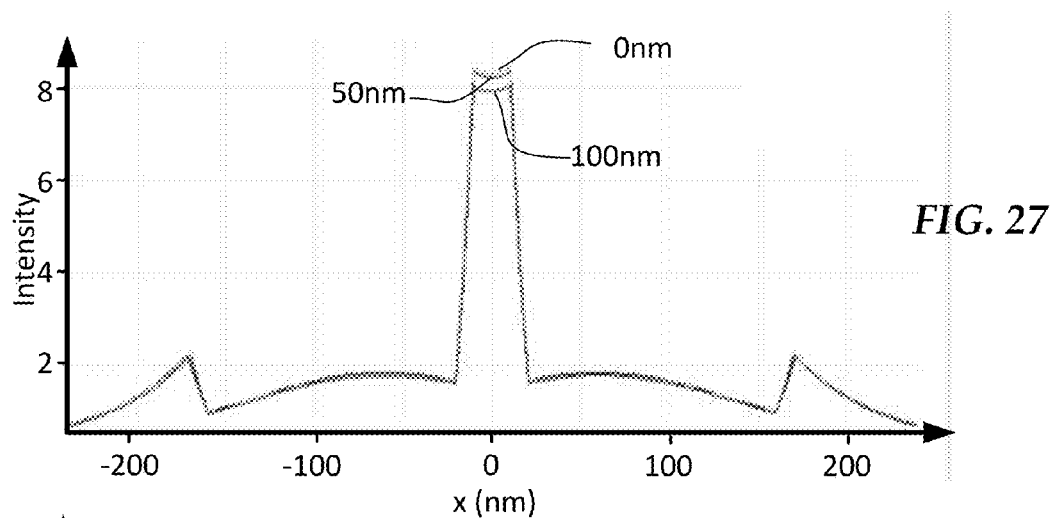
FIGS. 27-33 are graphs showing how the intensity of a tapered slot waveguide is sensitive to various design parameters according to example embodiments.
Figure 28:
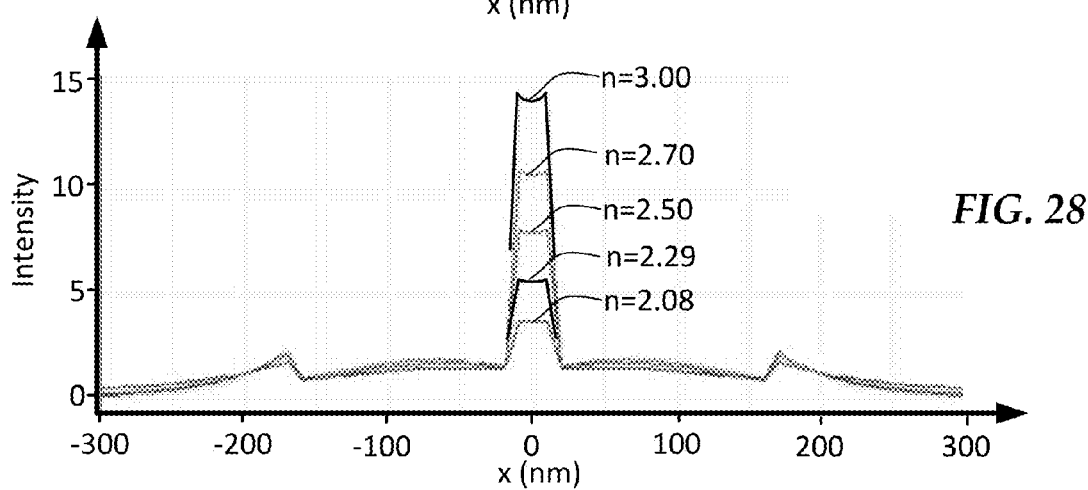

In FIGS. 27-33, graphs show how the cross-track intensity profile of a tapered slot waveguide is sensitive to various design parameters. In FIG. 27, the light intensity profile near the NFT is modeled for different values of NFT-to-core separation in the y-direction. In FIG. 28, the light intensity profile near the NFT is modeled for different values of high-index material (e.g., TaOx, n=2.08; NbOx n=2.29; BTO, n=2.50; SiCH, n=2.70). The higher index materials result in greater intensity values at the NFT.

Figure 29:
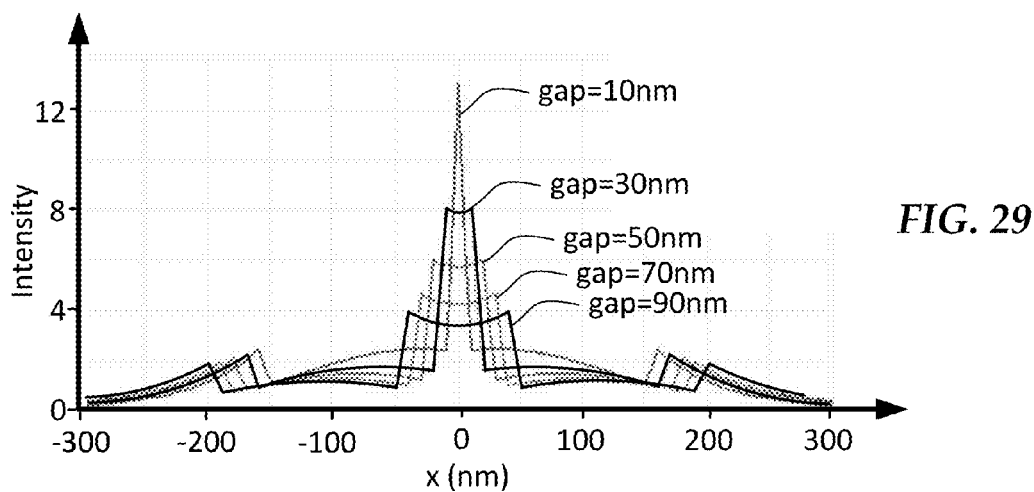
Figure 30:
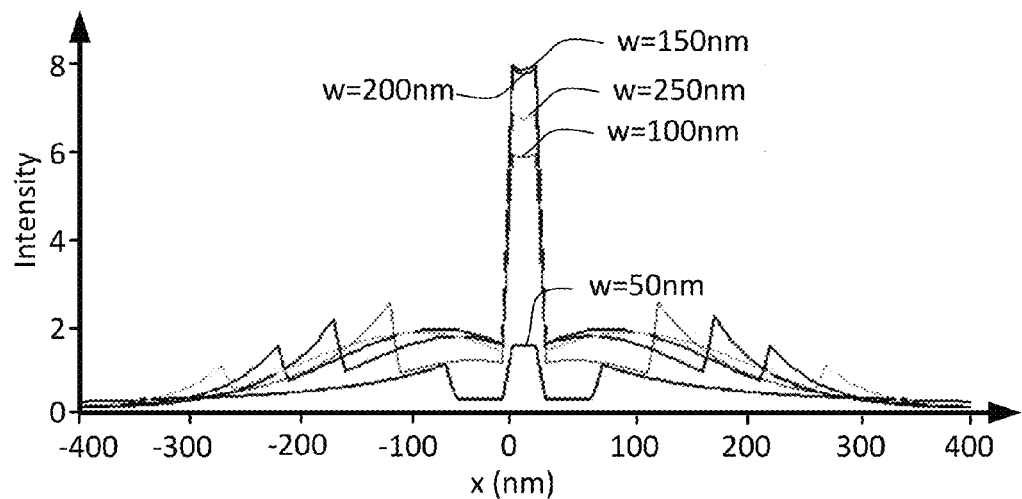
Figure 31:
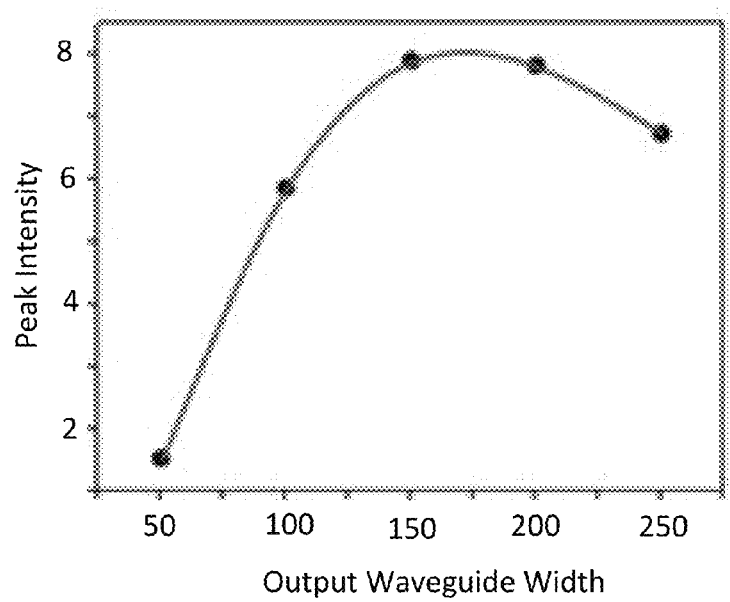
Figure 32:
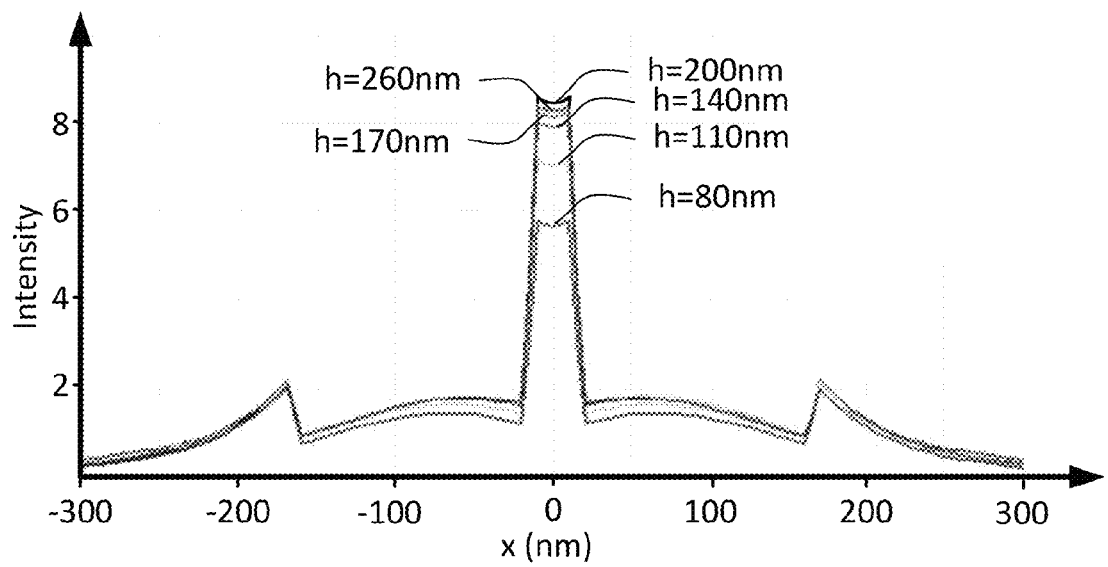
Figure 33:
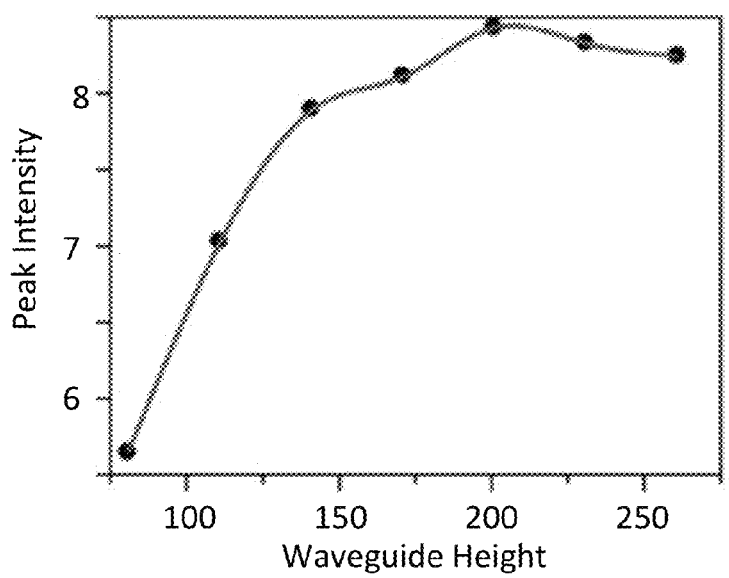

In FIG. 29, the light intensity profile near the NFT is shown for different values of gap widths, which is the cross-track width of the constant-width portion 1900e shown in FIG. 19. Decreasing the width compresses/concentrates the energy as indicated by the higher intensity for narrower width. In FIG. 30, the light intensity profile near the NFT is shown for different values of width of the high-index, constant width portions near the media-facing surface (e.g., cross-track width of portions 1902d and 1904d in FIG. 19). The peak values are also plotted in FIG. 31 as a function of waveguide width. For this example, the optimal waveguide width is about 170 nm. In FIG. 32, the light intensity profile near the NFT is shown for different heights of the high-index portion, e.g., downtrack dimension of portions 1902 and 1904 in FIG. 19. Peak intensity is also plotted in FIG. 33 as a function of waveguide height. The optimal waveguide height for this example is about 200 nm.

Figure 34:
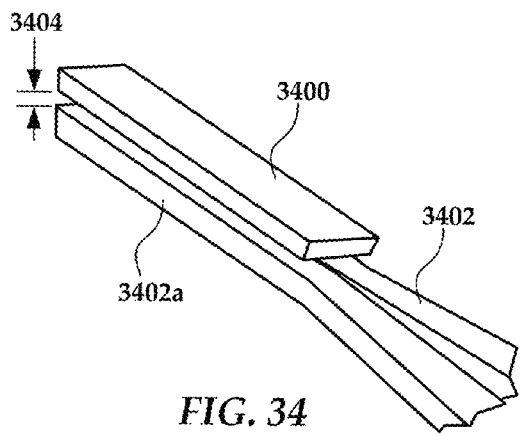
FIG. 34 is a perspective view showing a top waveguide positioned downtrack from an output of tapered slot waveguide according to an example embodiment.

The analysis also considered an embodiment with a top waveguide portion overlapping the output portion of the tapered channel waveguide. In FIG. 34, a perspective view shows a top waveguide 3400 positioned downtrack from an output of tapered slot waveguide 3402. The top waveguide 3400 is placed over a second constant-width portion 3402a of the slot waveguide 3402, which has similar features to the waveguide shown in FIG. 19. A spacer 3404 (e.g., gap filled with a dielectric of low-index material) may separate the top waveguide 3400 and tapered slot waveguide 3402. In FIGS. 35-38, graphs show modeling results for top waveguide configurations according to an example embodiment.

Figure 35:
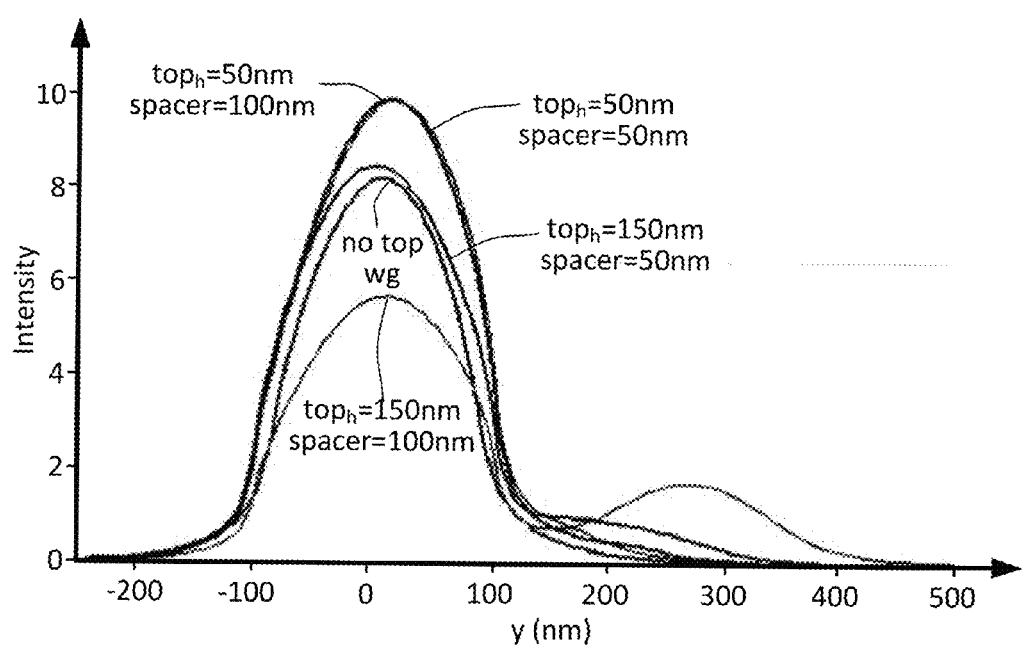
FIGS. 35-38 are graphs showing modeling results for top waveguide configurations according to an example embodiment.
Figure 36:
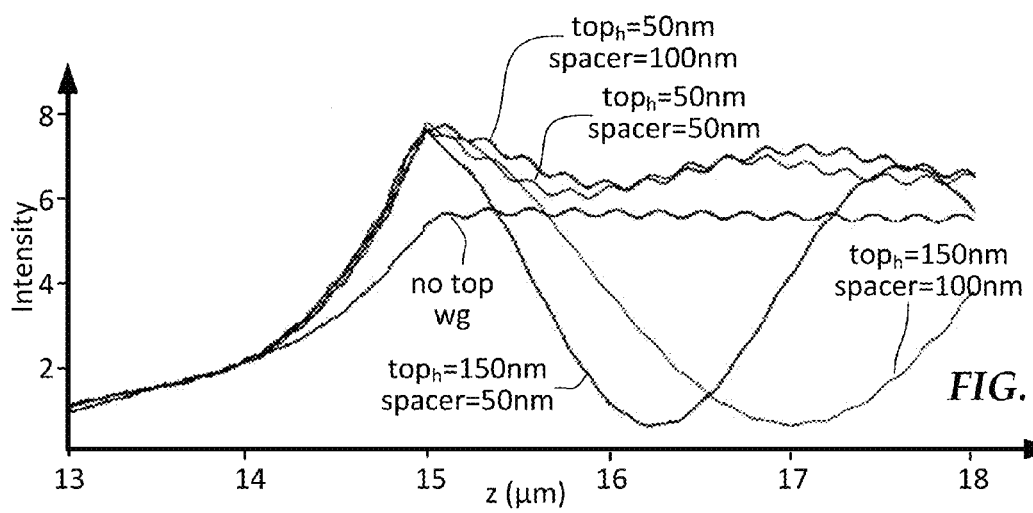
Figure 37:
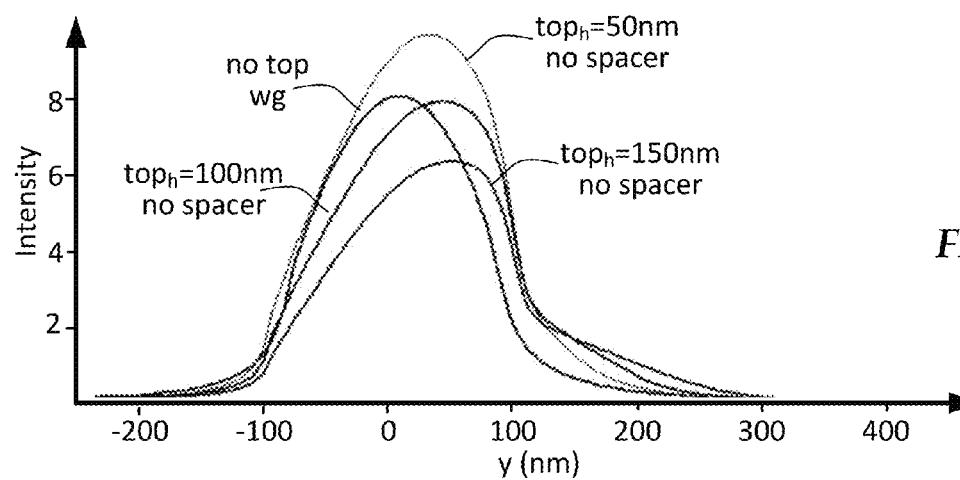
Figure 38:
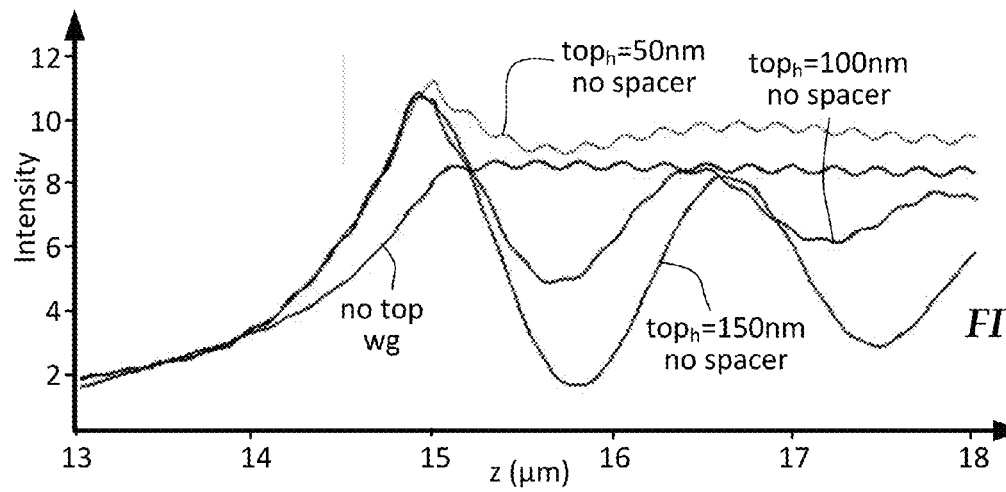

In FIG. 35, a graph shows a downtrack intensity profile of a tapered slot waveguide for various waveguide heights and spacer values. A thin top waveguide (height of 50 nm) to increases peak downtrack intensity and improve confinement. In FIG. 36, a graph shows an intensity profile along the propagation direction (z-direction in these examples) for the same waveguide heights and spacer values shown in FIG. 35. Propagation of light with a thicker (e.g., 150 nm) top waveguide becomes unstable, e.g., beating between two modes. The graphs in FIGS. 37 and 38 show similar analyses but with no spacer. These results indicate a thin waveguide appears to increase confinement and maximum intensity, and also shows steeper leading edge profile in FIG. 37.

Figure 39:
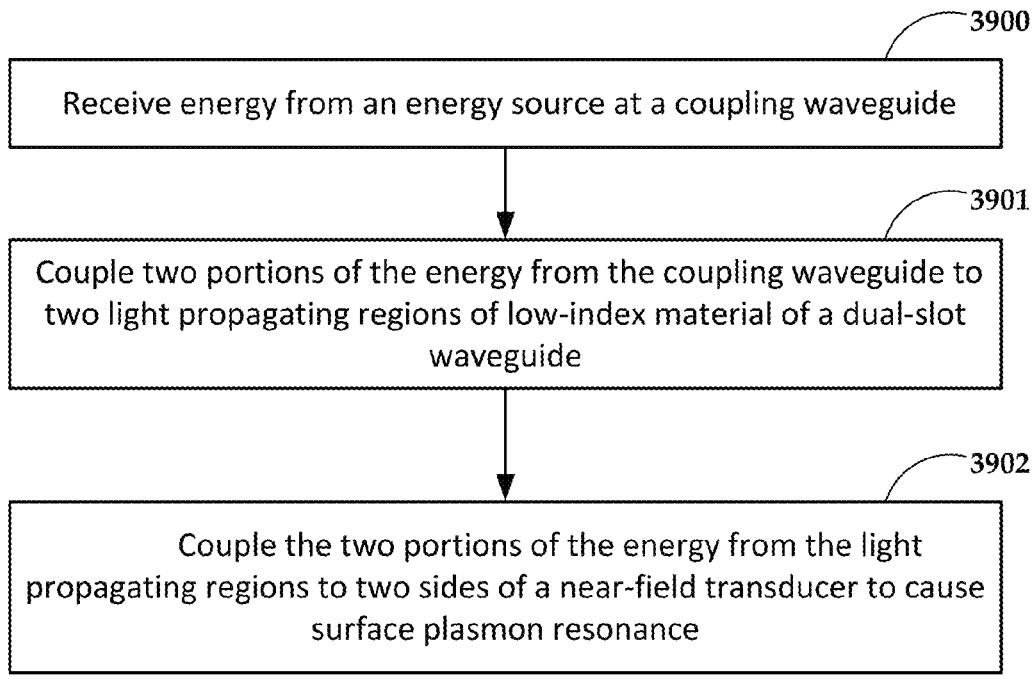
FIGS. 39 and 40 are flowcharts of methods according to example embodiments.

In FIG. 39, a flowchart illustrates a method according to an example embodiment. The method involves receiving 3900 energy from an energy source at a coupling waveguide. First and second portions of the energy are coupled 3901 from the coupling waveguide to first and second light propagating regions of low-index material of a dual-slot waveguide. The first and second light propagating regions of low-index material are located side-by-side in a direction normal to a light propagation direction. Inner sides of the first and second light propagating regions are separated by at least one first region of high-index material. A second region and a third region of high-index material surround outer sides of the first and second light propagating regions. The first and second portions of the energy are coupled 3902 from the first and second light propagating regions to first and second sides of a near-field transducer. The first and second portions of the energy cause surface plasmon resonance of the near-field transducer.

Figure 40:
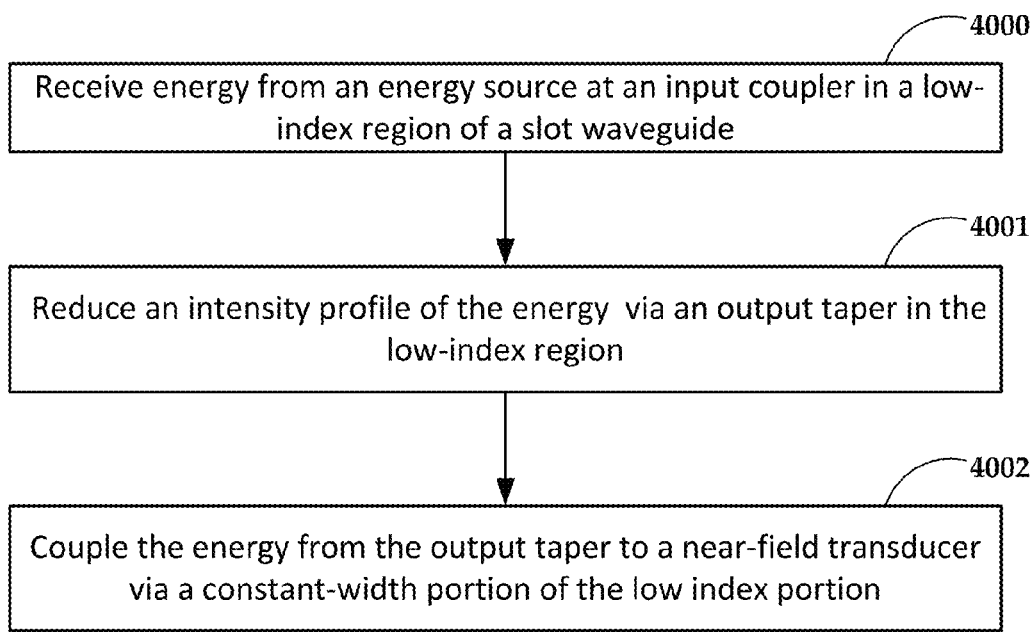

In FIG. 40, a flowchart illustrates a method according to another example embodiment. The method involves receiving 4000 energy from an energy source at an input coupler of a slot waveguide. The slot waveguide includes a low-index region surrounded by first and second high index regions, and the input coupler is part of the low-index region. An intensity profile of the energy is reduced 4001 via an output taper in the low-index region. Energy is coupled 4002 from output taper to a near-field transducer via a constant-width portion of the low-index portion. Coupling of the energy causes surface plasmon resonance of the near-field transducer.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
a coupling waveguide configured to receive energy from an energy source;
a dual-slot waveguide receiving the energy from the coupling waveguide and comprising first and second light propagating regions of first and second low-index material located side-by-side in a direction normal to a light propagation direction, inner sides of the first and second light propagating regions separated by at least one first region of a high-index material, second and third regions of the high-index material surrounding outer sides of the first and second light propagating regions; and
a near-field transducer proximate an output end of the dual-slot waveguide, the near-field transducer comprising first and second sides that receive respective first and second portions of the energy from the first and second light propagating regions.

2. The apparatus of claim 1, wherein the first and second light propagating regions are formed as slots in a channel of the high-index material, the slots and the channel extending along the light propagation direction, the channel surrounded on one side by a layer of the low-index material, and wherein the layer of the low-index material and the channel are surrounded on both sides by a cladding material that has a lower index of refraction than the low-index material.

3. The apparatus of claim 2, the cladding material fills the slots.

4. The apparatus of claim 2, wherein the low-index material fills the slots.

5. The apparatus of claim 1, wherein the coupling waveguide comprises a tapered portion that transitions to the at least one first region of the first high-index material, the coupling waveguide separating and coupling the first and second portions of the energy into the first and second light propagating regions.

6. The apparatus of claim 1, wherein the near-field transducer comprises a stadium portion and a peg extending therefrom towards a recording medium.

7. The apparatus of claim 1, wherein the first and second portions of the energy comprise different polarizations.

8. The apparatus of claim 1, wherein the first and second portions of the energy are asymmetric in a cross-track direction.

9. The apparatus of claim 1, wherein inner sides of the second and third regions of the second high index material comprise indentations which surround the near-field transducer.

10. The apparatus of claim 9, wherein an end of the first region of the first high index material extends between the indentations.

11. The apparatus of claim 10, wherein the end of the first region of the first high index material is enlarged.

12. The apparatus of claim 9, further comprising an island of a high index material between the indentations, the island isolated from an end of the first region of the high index material by a low-index material.

13. An apparatus comprising:
a slot waveguide configured to receive energy from an energy source, the slot waveguide comprising first and second high-index regions surrounding a middle, low-index region that extends along a light propagation direction, the first and second high-index regions having angled portions that form an output taper that results in a reduced cross-track width in the low-index region as it approaches the media facing surface; and
a near-field transducer proximate an output portion of the low-index region at media-facing surface, light propagating through the low-index region and being coupled to the near-field transducer at the output portion.

14. The apparatus of claim 13, wherein the output portion of the low-index region comprises a constant cross-sectional width.

15. The apparatus of claim 14, further comprising a top waveguide portion overlapping the output portion in a downtrack direction.

16. The apparatus of claim 13, wherein the slot waveguide comprises an input coupler, the input coupler comprising a input taper that results in a decreasing cross-track dimension in the low-index region as it approaches the media facing surface.

17. The apparatus of claim 16, further comprising a constant width portion that joins the input taper with the output taper.

18. The apparatus of claim 13, wherein the angled portions of the first and second high index regions taper to a reduced cross-track dimension as they approach the media-facing surface.

19. The apparatus of claim 13, wherein the near-field transducer comprises an elongated peg that is aligned along the light propagation direction in the output portion of the low-index region.

20. A method comprising:
receiving energy from an energy source at a coupling waveguide;
coupling first and second portions of the energy from the coupling waveguide to first and second light propagating regions of low-index material of a dual-slot waveguide, the first and second light propagating regions of low-index material located side-by-side in a direction normal to a light propagation direction, inner sides of the first and second light propagating regions separated by at least one first region of high-index material, second and third regions of high-index material surrounding outer sides of the first and second light propagating regions; and
coupling the first and second portions of the energy from the first and second light propagating regions to first and second sides of a near-field transducer, the first and second portions of the energy causing surface plasmon resonance of the near-field transducer.

* * * * *